US012372917B2

(12) United States Patent
Minoshima et al.

(10) Patent No.: US 12,372,917 B2
(45) Date of Patent: Jul. 29, 2025

(54) IMAGE FORMING APPARATUS

(71) Applicant: BROTHER KOGYO KABUSHIKI KAISHA, Nagoya (JP)

(72) Inventors: Saya Minoshima, Gifu (JP); Tomonori Watanabe, Ichinomiya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 18/608,541

(22) Filed: Mar. 18, 2024

(65) Prior Publication Data

US 2024/0319662 A1 Sep. 26, 2024

(30) Foreign Application Priority Data

Mar. 24, 2023 (JP) ................................. 2023-049094

(51) Int. Cl.
*G03G 21/18* (2006.01)
*G03G 15/20* (2006.01)
*G03G 21/16* (2006.01)

(52) U.S. Cl.
CPC ..... *G03G 21/1842* (2013.01); *G03G 15/2017* (2013.01); *G03G 15/2064* (2013.01); *G03G 21/1619* (2013.01); *G03G 21/1647* (2013.01)

(58) Field of Classification Search
CPC ........... G03G 21/1842; G03G 15/2017; G03G 15/2064; G03G 21/1619; G03G 21/1647; G03G 21/1633; G03G 21/1685
See application file for complete search history.

(56) References Cited

U.S. PATENT DOCUMENTS

| | | | | |
|---|---|---|---|---|
| 2019/0163103 A1 | 5/2019 | Iizuka | | |
| 2019/0163121 A1* | 5/2019 | Wada | ................ | G03G 15/2017 |
| 2021/0318657 A1* | 10/2021 | Johnson, Jr. | ....... | G03G 21/1685 |
| 2023/0082752 A1* | 3/2023 | Toyota | ............... | G03G 21/1633 399/328 |

FOREIGN PATENT DOCUMENTS

| | | |
|---|---|---|
| JP | 2019-95643 A | 6/2019 |

* cited by examiner

*Primary Examiner* — Sandra Brase
(74) *Attorney, Agent, or Firm* — Merchant & Gould P.C.

(57) ABSTRACT

A shutter moves between a closed position at which the shutter covers a nip of a fuser and an open position at which the nip is exposed. A link contacts a cartridge. The link is coupled to the shutter and moves the shutter between the open position and the closed position. The link is movable between a first position at which the cartridge is not attached to an apparatus main body and a second position at which the cartridge is attached to the apparatus main body. When the cartridge being attached to the apparatus main body contacts the link, the shutter moves from the closed position toward the open position. Before the shutter reaches the open position, the link and the cartridge separate from each other. The link having separated from the cartridge moves further in a direction in which the shutter becomes the open position.

18 Claims, 23 Drawing Sheets

IMAGE FORMING APPARATUS

REFERENCE TO RELATED APPLICATIONS

This application claims priority from Japanese Patent Application No. 2023-049094 filed on Mar. 24, 2023. The entire content of the priority application is incorporated herein by reference.

BACKGROUND ART

An image forming apparatus including a detachably attached cartridge is known.

SUMMARY

In an image forming apparatus including a detachable cartridge, a shutter is provided forward of a fuser (fixing device) having a heating member.

For example, the image forming apparatus is provided with a link member that is connected to the shutter and is contactable with the cartridge. When the cartridge is attached, the link member contacts the cartridge and moves, and the shutter is opened in accordance with the movement of the link member. In this case, the link member is configured to be pressed by the cartridge until the shutter is completely opened.

As described above, in the case of the configuration in which the link member is configured to be pressed by the cartridge until the shutter is completely opened, when the cartridge is further pushed in an attaching direction after the shutter is opened, only the link is configured to move, so that a cartridge operation by the user does not affect an open/closed state of the shutter. Thus, it is necessary to set a large movement range of the link.

In view of the foregoing, an example of an object of this disclosure is to provide an image forming apparatus in which a cartridge operation by the user does not affect an open/closed state of a shutter when the shutter is opened, without increasing a movement range of a link.

According to one aspect, this specification discloses an image forming apparatus. The image forming apparatus includes an apparatus main body, a fuser, a shutter, and a link. A cartridge is detachably attachable to the apparatus main body. The fuser includes a heating rotor and a pressure rotor configured to form a nip therebetween. The shutter is movable between a closed position at which the shutter covers the nip and an open position at which the nip is exposed. The link is configured to contact the cartridge. The link is coupled to the shutter and is configured to move the shutter between the open position and the closed position. The link is movable between a first position at which the cartridge is not attached to the apparatus main body and a second position at which the cartridge is attached to the apparatus main body. The link and the shutter are configured as follows. When the cartridge being attached to the apparatus main body contacts the link, the shutter moves from the closed position toward the open position. Thus, the shutter is moved to the open position in accordance with an operation of attaching the cartridge to the apparatus main body. Before the shutter reaches the open position, the link and the cartridge separate from each other. The link having separated from the cartridge moves further in a direction in which the shutter becomes the open position. Thus, the user's operation on the cartridge does not affect the open/closed state of the shutter, and the movement range of the link is kept small.

According to another aspect, this specification also discloses an image forming apparatus. The image forming apparatus includes an apparatus main body, a fuser, a shutter, and a link. A cartridge is detachably attachable to the apparatus main body. The fuser is configured to heat and pressurize a sheet formed with a toner image thereon. The fuser has an opening that allows the sheet to be conveyed therethrough. The shutter is movable between a closed position at which the shutter covers the opening and an open position at which the sheet is able to pass through the opening. The link is configured to contact the cartridge. The link is coupled to the shutter and configured to move the shutter between the open position and the closed position. In a case that the cartridge moves from outside of the apparatus main body toward an attached position, the link contacts the cartridge and moves the shutter from the closed position toward the open position, the link separates from the cartridge before the cartridge reaches the attached position, and the link moves the shutter to the open position after the link and the cartridge separate from each other.

DESCRIPTION

Next, an embodiment for carrying out the present disclosure will be described with reference to the accompanying drawings.

[Image Forming Apparatus]

Figure 1:
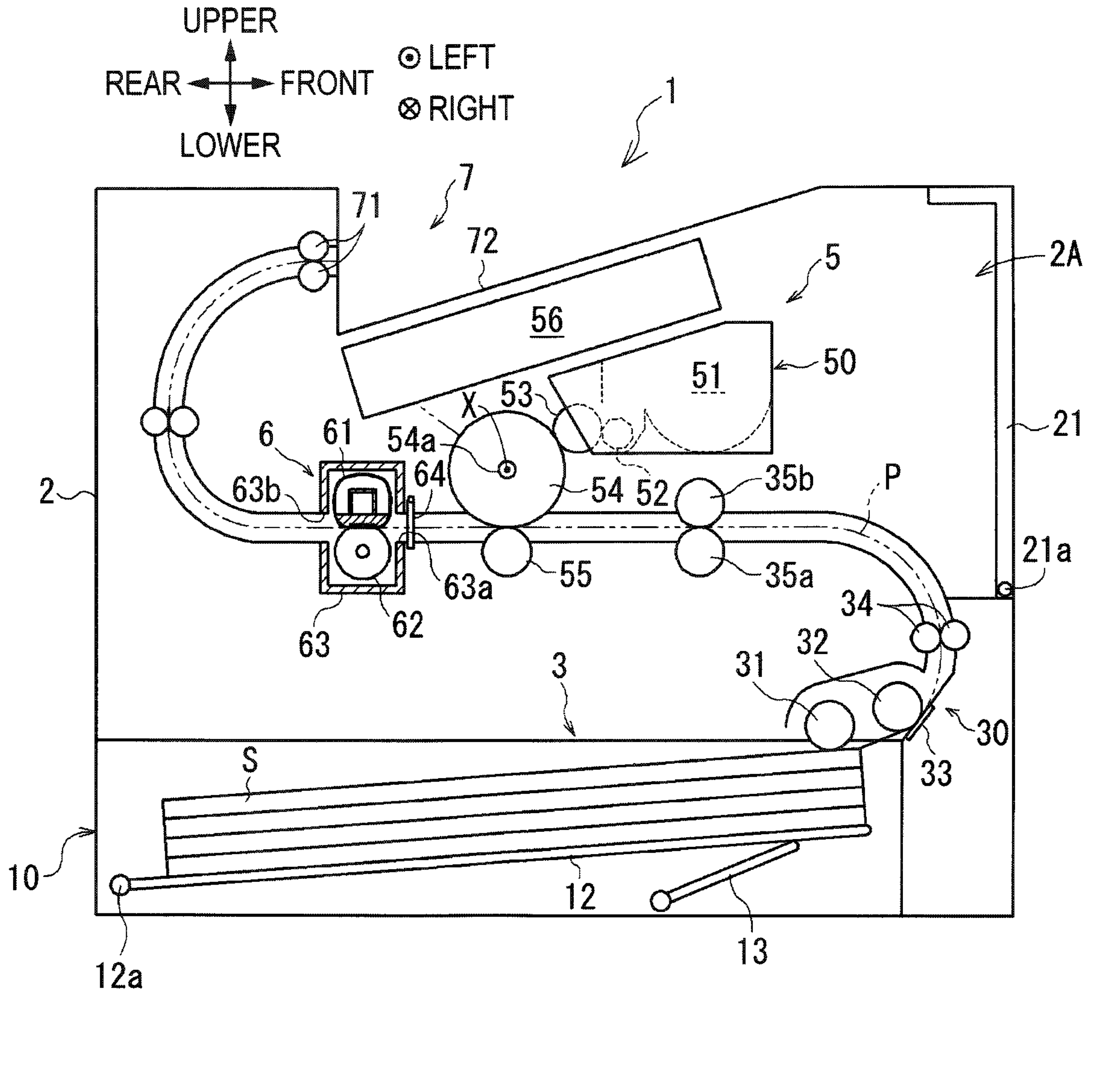
FIG. 1 is a central cross-sectional view showing an image forming apparatus.

An image forming apparatus 1 shown in FIG. 1 is an embodiment of an image forming apparatus including a sheet conveyor, and is a laser printer that forms an image on a sheet S by an electrophotographic method.

In the following description, the right side in FIG. 1 is defined as the front side of the image forming apparatus 1, the left side in FIG. 1 is defined as the rear side of the image forming apparatus 1, the near side in a direction perpendicular to the drawing sheet of FIG. 1 is defined as the left side of the image forming apparatus 1, and the far side in the direction perpendicular to the drawing sheet of FIG. 1 is defined as the right side of the image forming apparatus 1. The upper side and the lower side in FIG. 1 are defined as the upper side and the lower side of the image forming apparatus 1, respectively.

The image forming apparatus 1 includes an apparatus main body 2, a sheet feeder 3, a print engine (image forming section) 5, a fuser (fixing device) 6, and a sheet discharge section 7.

The apparatus main body 2 accommodates the sheet feeder 3, the print engine 5, the fuser 6, and the sheet discharge section 7. An opening 2A is opened in the front surface of the apparatus main body 2, and the apparatus main body 2 has a front cover 21 configured to open and close the opening 2A. The front cover 21 is configured to be swingable about a swing shaft 21*a* at a lower end thereof, and is movable between a closed position at which the opening 2A is closed and an open position at which the opening 2A is opened by swinging about the swing shaft 21*a*.

The sheet feeder 3 includes a sheet feed tray 10 for supporting the sheet S, a sheet conveyor 30, a pair of conveyance rollers 34, and a registration roller 35*a*. The sheet feeder 3 is disposed in a lower portion of the apparatus main body 2 and conveys the sheet S supported by the sheet feed tray 10 to the print engine 5. The image forming apparatus 1 has a conveyance path P for the sheet S from the sheet feeder 3 to the sheet discharge section 7 via the print engine 5.

The sheet feed tray 10 includes a pressure plate 12 and a pressing plate 13. The pressure plate 12 is a plate-like member that supports the sheet S from below. The pressure plate 12 is swingable about a swing axis 12*a* at a rear end thereof, and is movable up and down between a lowered position and a raised position by swinging about the swing axis 12*a*. The pressing plate 13 is located below the pressure plate 12 and moves the pressure plate 12 up and down between the lowered position and the raised position.

The sheet conveyor 30 is a conveyance mechanism that separates and takes out the sheets S supported by the sheet feed tray 10 one sheet at a time and conveys the sheet S toward the print engine 5. The sheet conveyor 30 includes a sheet feed roller 31, a separation roller 32, and a separation pad 33.

The sheet feed roller 31 is a roller for feeding the sheet S supported by the sheet feed tray 10 toward the separation roller 32. The separation roller 32 is disposed downstream of the sheet feed roller 31 in a sheet conveyance direction. The separation pad 33 is disposed to face the separation roller 32 and is urged toward the separation roller 32.

The sheets S fed toward the separation roller 32 by the sheet feed roller 31 are separated one sheet at a time between the separation roller 32 and the separation pad 33. The separated sheet S is sent out to the conveyance path P.

The sheet S sent out to the conveyance path P is conveyed toward the print engine 5 by the pair of conveyance rollers 34, the registration roller 35*a*, and a pinch roller 35*b* disposed to face the registration roller 35*a*. The registration roller 35*a* regulates the movement of the leading edge of the sheet S that is being conveyed and temporarily stops the sheet S, and then conveys the sheet S toward the print engine 5 at a particular timing.

The print engine 5 is disposed downstream of the sheet feeder 3 in the sheet conveyance direction, and forms an image on the sheet S conveyed from the sheet feeder 3. The print engine 5 includes a process cartridge 50 that transfers an image onto a surface of the sheet S conveyed from the sheet feeder 3, a transfer roller 55 that is disposed to face a photosensitive drum 54 of the process cartridge 50, and an exposure unit 56 that exposes a surface of the photosensitive drum 54 to light.

The process cartridge 50 is disposed above the sheet feeder 3 in the apparatus main body 2, and includes a developer storage chamber 51, a supply roller 52, a development roller 53, the photosensitive drum 54, and so on. The process cartridge 50 supports the pinch roller 35*b*.

The process cartridge 50 includes a drum cartridge having the photosensitive drum 54, and a development cartridge attached to the drum cartridge and having the development roller 53. The process cartridge 50 is detachably attached to the apparatus main body 2. In this case, the process cartridge 50 is attached to the apparatus main body 2 by integrally inserting the drum cartridge and the development cartridge attached to the drum cartridge into the apparatus main body 2, and is detached from the apparatus main body 2 by integrally pulling the drum cartridge and the development cartridge attached to the drum cartridge out of the apparatus main body 2.

The process cartridge 50 is an example of a cartridge, and may include at least a photosensitive drum, a development roller, or a toner container. The process cartridge 50 is attachable to and detachable from the apparatus main body 2 when the front cover 21 is at the open position.

The photosensitive drum 54 is disposed in a posture in which an axis X extends along the left-right direction in a state where the process cartridge 50 is attached to the apparatus main body 2. The photosensitive drum 54 has a metal drum shaft 54*a* extending along the direction of the axis X. The photosensitive drum 54 rotates about the drum shaft 54*a*.

In the present embodiment, the process cartridge 50 includes the drum cartridge having the photosensitive drum 54 and the development cartridge attached to the drum cartridge and having the development roller 53. Alternatively, the process cartridge 50 may include a cartridge having the photosensitive drum 54 and the development roller 53, and a toner box attached to the cartridge and containing toner.

In the image forming apparatus, a drum cartridge including the photosensitive drum 54 and a development cartridge including the development roller 53 may be separately attached to the apparatus main body 2. That is, the process cartridge 50 may include at least a photosensitive drum, a development roller, or a toner container, and may be configured to be detachably attached to the apparatus main body 2.

The exposure unit 56 includes a laser diode, a polygon mirror, a lens, a reflecting mirror, and so on. The exposure unit 56 exposes the surface of the photosensitive drum 54 by irradiating the photosensitive drum 54 with laser light based on image data input to the image forming apparatus 1.

The developer storage chamber 51 stores toner as developer. The toner stored in the developer storage chamber 51 is sent to the supply roller 52 while being agitated by an agitating member (not shown). The supply roller 52 further sends the toner sent from the developer storage chamber 51 to the development roller 53.

The development roller 53 is disposed in close contact with the supply roller 52, and bears the toner supplied from the supply roller 52 and positively charged by a sliding contact member (not shown). A development bias is applied to the development roller 53 by a bias applying unit (not shown).

The photosensitive drum 54 is disposed adjacent to the development roller 53. The surface of the photosensitive drum 54 is uniformly charged by a charger (not shown) and then exposed by the exposure unit 56. The exposed portion of the photosensitive drum 54 has a lower potential than the other portion, and an electrostatic latent image based on the image data is formed on the photosensitive drum 54. Then, positively charged toner is supplied from the development roller 53 to the surface of the photosensitive drum 54 on which the electrostatic latent image is formed, whereby the electrostatic latent image is visualized to form a toner image.

The transfer roller 55 is disposed to face the photosensitive drum 54, and a transfer bias is applied to the transfer roller 55 by a bias applying unit (not shown). In a state where the transfer bias is applied to the surface of the transfer roller 55, the sheet S is nipped and conveyed between the photosensitive drum 54 on which the toner image is formed and the transfer roller 55, whereby the toner image formed on the surface of the photosensitive drum 54 is transferred onto the surface of the sheet S. The sheet S on which the toner image is transferred is conveyed to the fuser 6.

The fuser 6 includes a heating unit 61 and a pressure roller 62, and thermally fixes the image transferred onto the sheet S by the process cartridge 50. The heating unit 61 is heated by supplying electric power from a power source (not shown). The heating unit 61 is an example of a heating rotor, and the pressure roller 62 is an example of a pressure rotor. The pressure roller 62 is disposed to face the heating unit 61. One of the heating unit 61 and the pressure roller 62 is urged toward the other by an urging mechanism (not shown), and the heating unit 61 and the pressure roller 62 are in close contact with each other.

When the sheet S to which the toner image is transferred is conveyed to the fuser 6, the sheet S is heated while being conveyed between the heating unit 61 and the pressure roller 62, and the toner image is thermally fixed to the sheet S. In this way, the fuser 6 thermally fixes the transferred toner image to the sheet S that is being conveyed.

The sheet discharge section 7 is located downstream of the print engine 5 in the sheet conveyance direction, and discharges the sheet S on which an image is formed by the print engine 5 to the outside of the image forming apparatus 1. The sheet discharge section 7 includes a pair of sheet discharge rollers 71 and a sheet discharge tray 72. The pair of sheet discharge rollers 71 is configured to discharge the sheet S conveyed from the fuser 6 along the conveyance path P toward the outside of the apparatus main body 2. The sheet discharge tray 72 is formed on the upper surface of the apparatus main body 2, and supports the sheet S discharged to the outside of the apparatus main body 2 by the pair of sheet discharge rollers 71.

Figure 2:
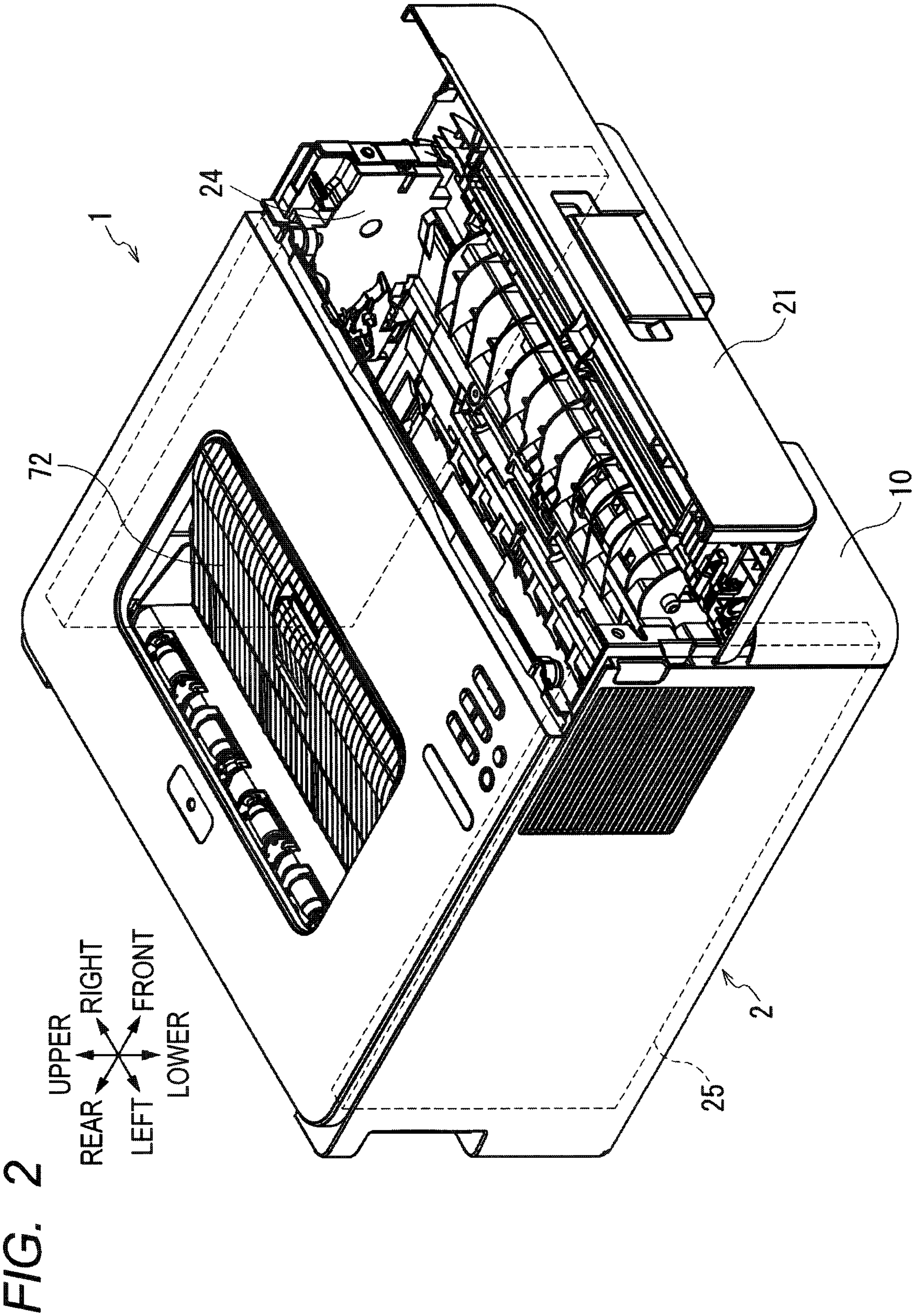
FIG. 2 is a perspective view of the image forming apparatus in a state where a front cover is at an open position.

As shown in FIG. 2, the apparatus main body 2 includes a first main frame 24 and a second main frame 25 which are arranged to be separated from each other in the left-right direction. The first main frame 24 is located at a right end of the apparatus main body 2, and the second main frame 25 is located at a left end of the apparatus main body 2. The first main frame 24 extends in the front-rear direction and the upper-lower direction, and is disposed in a posture in which plate surfaces face in the left-right direction. The second main frame 25 extends in the front-rear direction and the upper-lower direction, and is disposed in a posture in which plate surfaces face in the left-right direction.

The process cartridge 50 and the fuser 6 are disposed between the first main frame 24 and the second main frame 25. The first main frame 24 is disposed on the right side of the process cartridge 50 and the fuser 6, and the second main frame 25 is disposed on the left side of the process cartridge 50 and the fuser 6. The process cartridge 50 is detachably supported by the first main frame 24 and the second main frame 25.

[Fuser]

Figure 3:
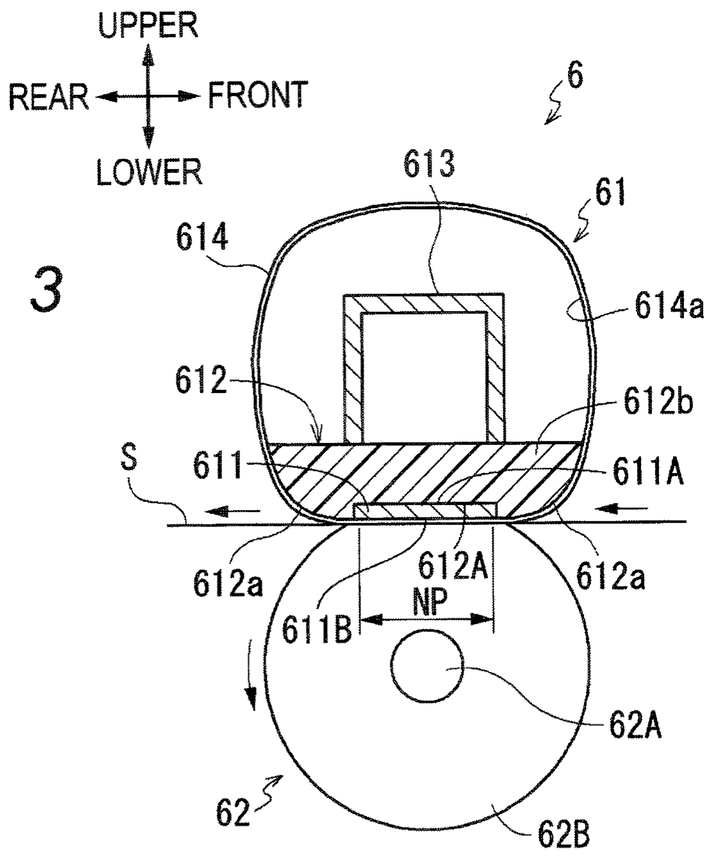
FIG. 3 is a side cross-sectional view showing a fuser.
Figure 4:
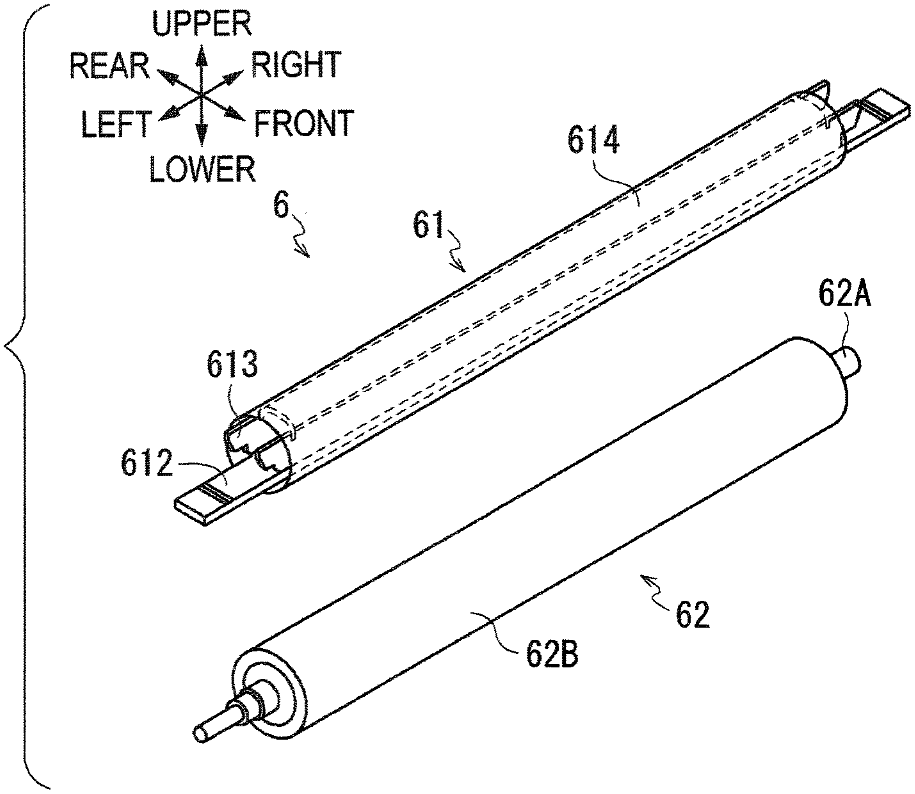
FIG. 4 is a perspective view showing a heating unit and a pressure roller of the fuser.
Figure 5A:
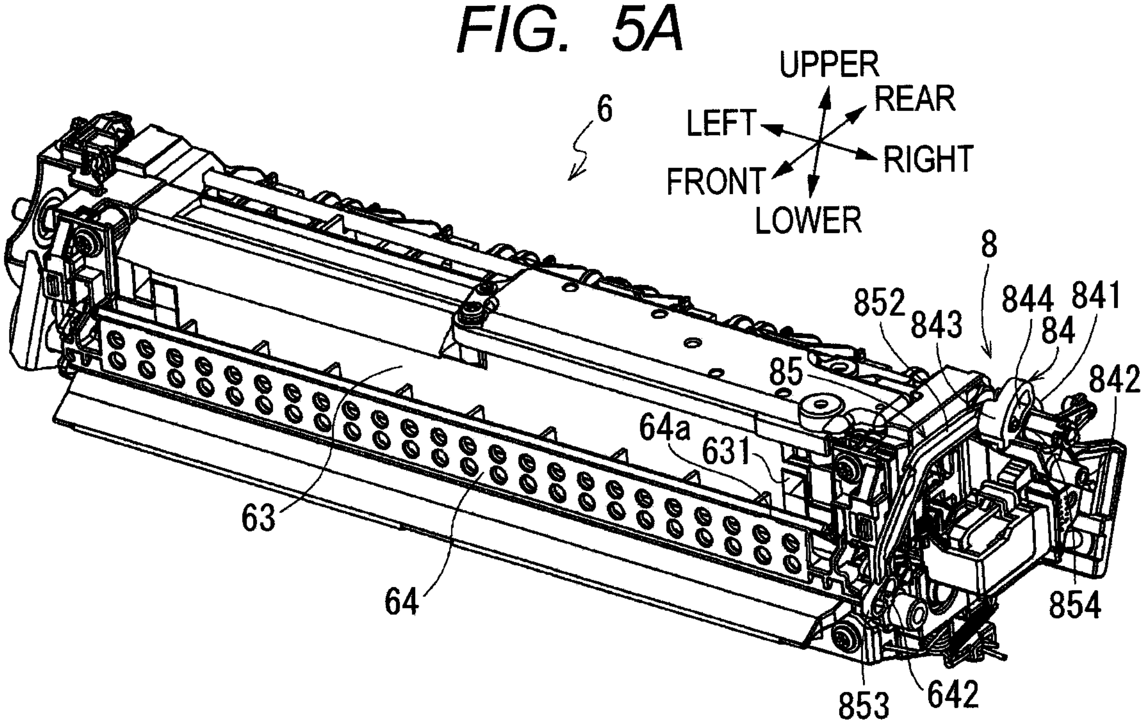
FIG. 5A is a perspective view showing the fuser in a state where a shutter is at a closed position.
Figure 5B:
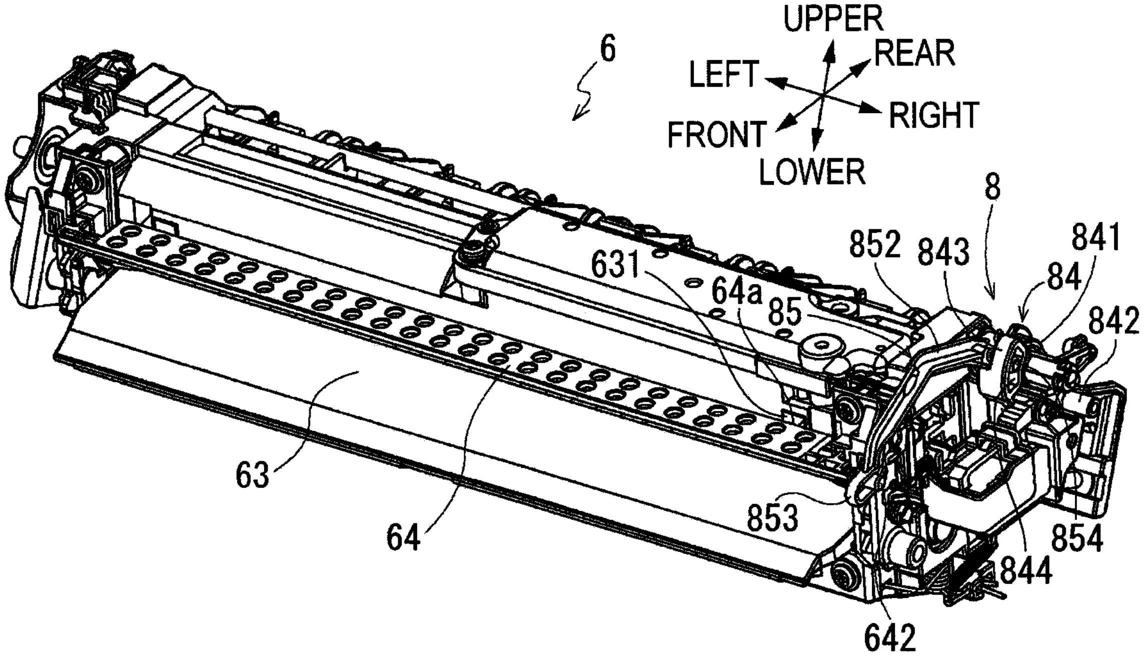
FIG. 5B is a perspective view showing the fuser in a state where the shutter is at an open position.

As shown in FIGS. 3 and 4, the heating unit 61 of the fuser 6 includes a heater 611, a holder 612, a stay 613, and a belt 614. The heater 611 is a plate-like heater extending in the left-right direction. The heater 611 has a first surface 611A and a second surface 611B opposite to the first surface 611A, and the first surface 611A is supported by the holder 612.

The holder 612 is made of, for example, a resin member, and has a guide surface 612*a* and a support wall 612*b*. The guide surface 612*a* contacts an inner peripheral surface 614*a* of the belt 614 to guide the belt 614. The support wall 612*b* has a support surface 612A that supports the heater 611. The support surface 612A of the support wall 612*b* contacts the first surface 611A of the heater 611. The stay 613 is a member that supports the holder 612. The stay 613 is formed by bending a plate material having a rigidity higher than that of the holder 612, for example, a steel plate, into a substantially U-shape in a cross-sectional view.

The belt 614 is an endless belt having heat resistance and flexibility, and includes a metal tube made of metal such as stainless steel, and a fluororesin layer covering the metal tube. The heater 611, the holder 612, and the stay 613 are arranged inside the belt 614. The belt 614 is configured to rotate around the heater 611, the holder 612, and the stay 613. The inner peripheral surface 614*a* of the belt 614 contacts the heater 611.

The pressure roller 62 includes a shaft 62A made of metal and an elastic layer 62B covering the shaft 62A. The pressure roller 62 is pressed against the heater 611 via the belt 614. The pressure roller 62 and the heater 611 sandwich the belt 614 therebetween, thereby forming a nip NP for heating and pressurizing the sheet S. That is, the pressure roller 62 forms the nip NP with the heating unit 61, and heats and presses the sheet S together with the heater 611 at the nip NP.

The pressure roller 62 is configured to be rotationally driven by a driving force transmitted from a motor 4 included in the image forming apparatus 1. The pressure roller 62 is rotationally driven to cause the belt 614 to followingly rotate by a frictional force with the belt 614 or the sheet S nipped at the nip NP. Thereby, the sheet S on which a toner image is transferred is conveyed between the pressure roller 62 and the heated belt 614, so that the toner image is thermally fixed.

As shown in FIGS. 1 and 5A to 7B, the fuser 6 includes a fixing frame 63 that covers the heating unit 61 and the pressure roller 62, and a shutter 64 that is supported by the fixing frame 63. The fixing frame 63 holds the heating unit 61 and the pressure roller 62. The fixing frame 63 covers the periphery of the heating unit 61 and the pressure roller 62. The fixing frame 63 has a first opening 63*a* formed upstream of the heating unit 61 and the pressure roller 62 in the sheet conveyance direction, and a second opening 63*b* formed downstream of the heating unit 61 and the pressure roller 62 in the sheet conveyance direction. The first opening 63*a* allows the sheet S to be conveyed therethrough in a state where the shutter 64 is at an open position described below. The fixing frame 63 covers the heating unit 61 from above.

The shutter 64 is located upstream of the first opening 63*a* in the fixing frame 63 in the sheet conveyance direction. The shutter 64 includes rotation shafts 641 extending along the left-right direction and a coupling shaft 642 protruding in a direction parallel to the rotation shafts 641. The rotation shafts 641 are rotatably supported by the fixing frame 63. The rotation shafts 641 are provided at the left and right ends of the shutter 64, and the coupling shaft 642 protrudes rightward from the right end of the shutter 64.

The shutter 64 is configured to be rotatable about the rotation shafts 641, and is movable between a closed position (position shown in FIGS. 5A, 6A, and 7A) at which the first opening 63*a* is closed and an open position (position shown in FIGS. 5B, 6B, and 7B) at which the first opening 63*a* is opened by rotating about the rotation shafts 641. When the shutter 64 is at the closed position, the nip NP between the heating unit 61 and the pressure roller 62 is covered by the shutter 64. When the shutter 64 is at the open position, the nip NP between the heating unit 61 and the pressure roller 62 is exposed to the outside of the fixing frame 63 through the first opening 63*a*.

The shutter 64 has a contact end portion 64*a* which is located at the upper end when the shutter 64 is at the closed position. The fixing frame 63 has a contact surface 631 with which the shutter 64 in the open position comes into contact. The contact surface 631 faces the upstream side in the sheet conveyance direction. The contact end portion 64*a* of the shutter 64 contacts the contact surface 631 when the shutter 64 is at the open position. The contact end portion 64*a* of the shutter 64 contacts the contact surface 631, thereby restricting the shutter 64 from moving further in the opening direction. That is, the contact surface 631 is a regulating surface that regulates the position of the shutter 64 by contacting the shutter 64 in the open position.

In the present embodiment, the fuser 6 includes the heating unit 61 having the heater 611 and the belt 614, and the pressure roller 62. Alternatively, the fuser 6 may include a heating roller having a heater therein and a pressure roller pressed against the heating roller. Further, the fuser 6 may include a heating roller having a heater therein and a pressure belt pressed against the heating roller by an elastic member.

[Drum Shaft]

Figure 8:
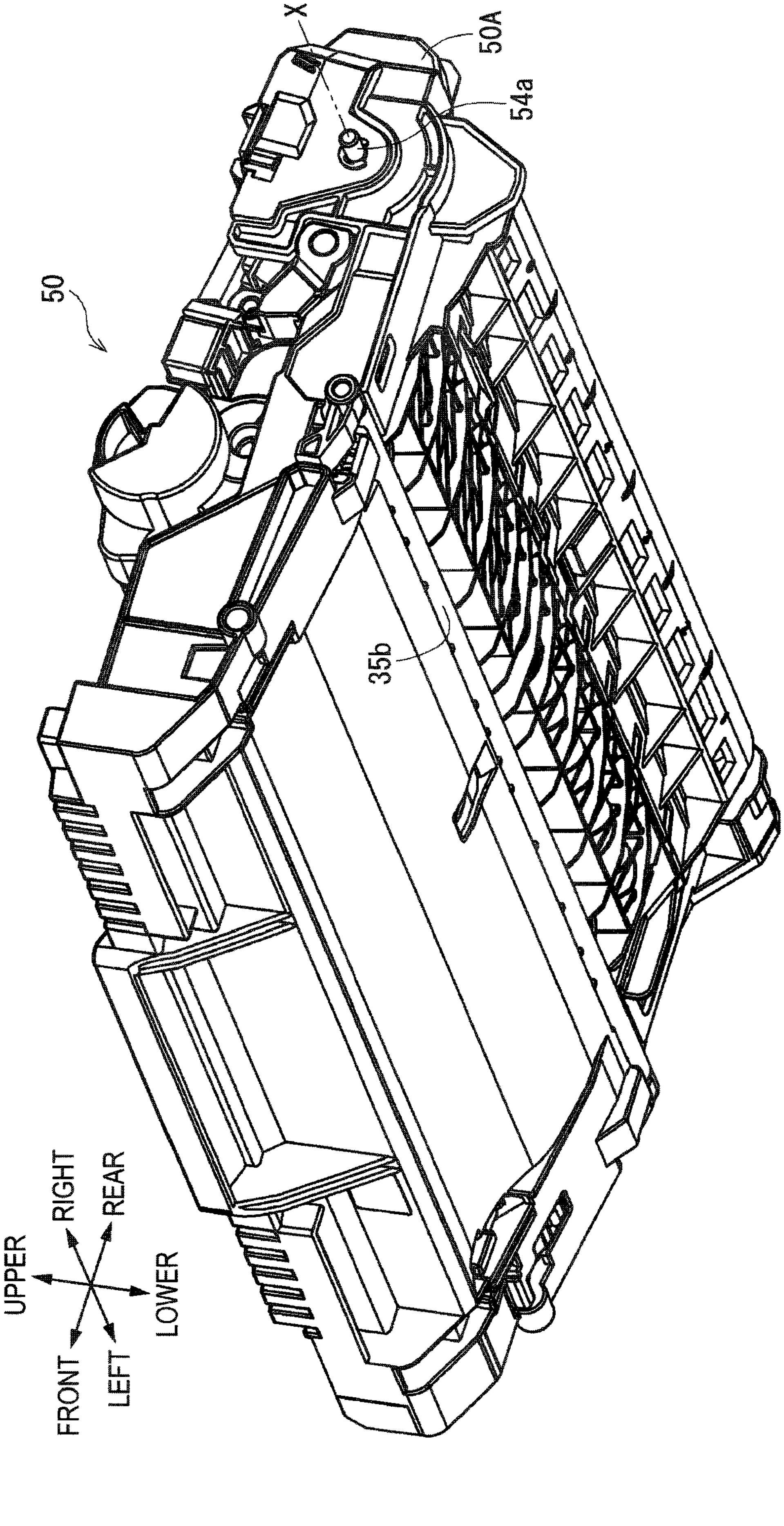
FIG. 8 is a perspective view of a process cartridge.
Figure 9:
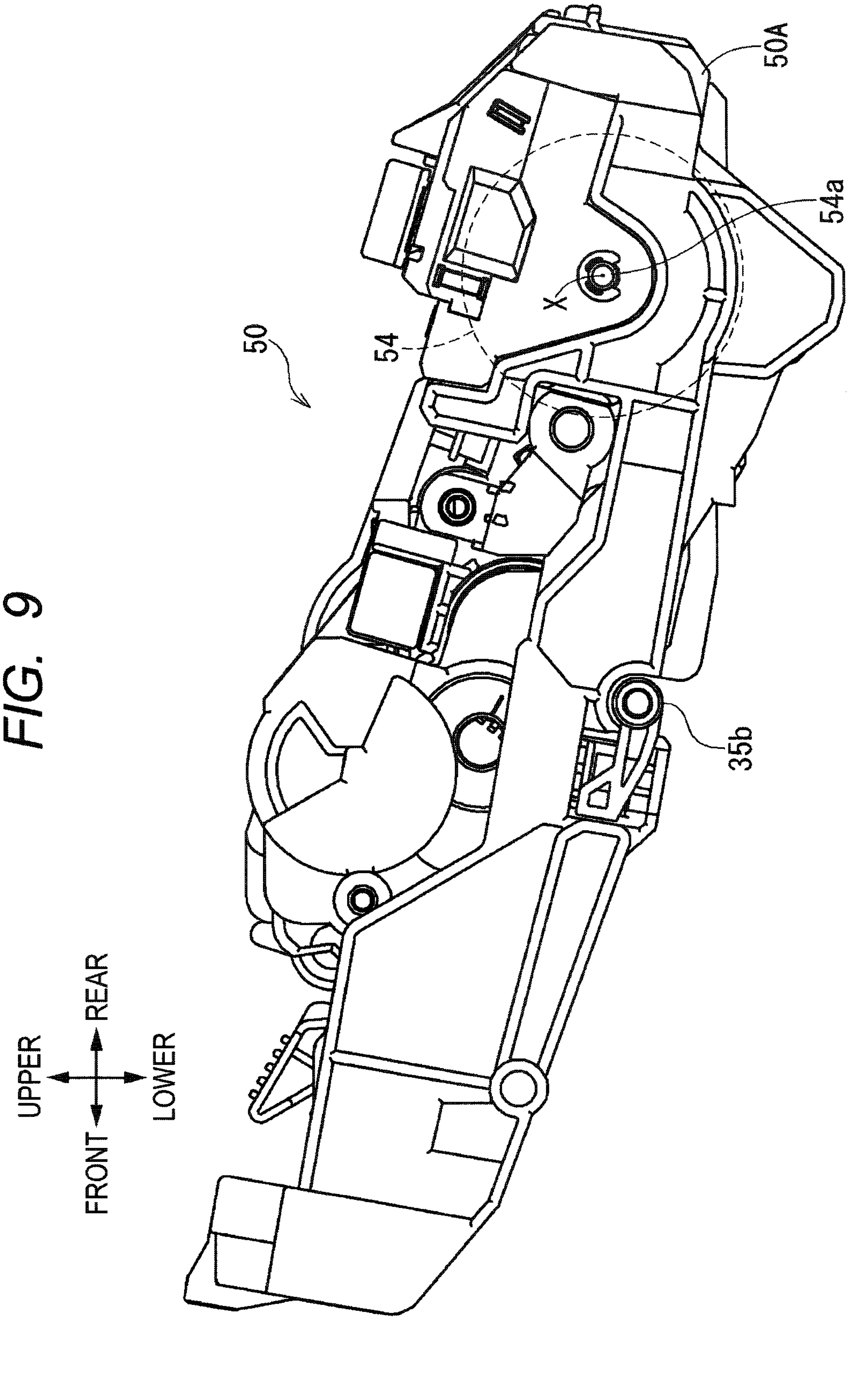
FIG. 9 is a side view of the process cartridge.

As shown in FIGS. 8 and 9, the drum shaft 54*a* of the photosensitive drum 54 protrudes rightward from the right end of the process cartridge 50 along the direction of the axis X. That is, the drum shaft 54*a* protrudes toward the first main frame 24 along the direction of the axis X.

[First Main Frame]

Figure 10:
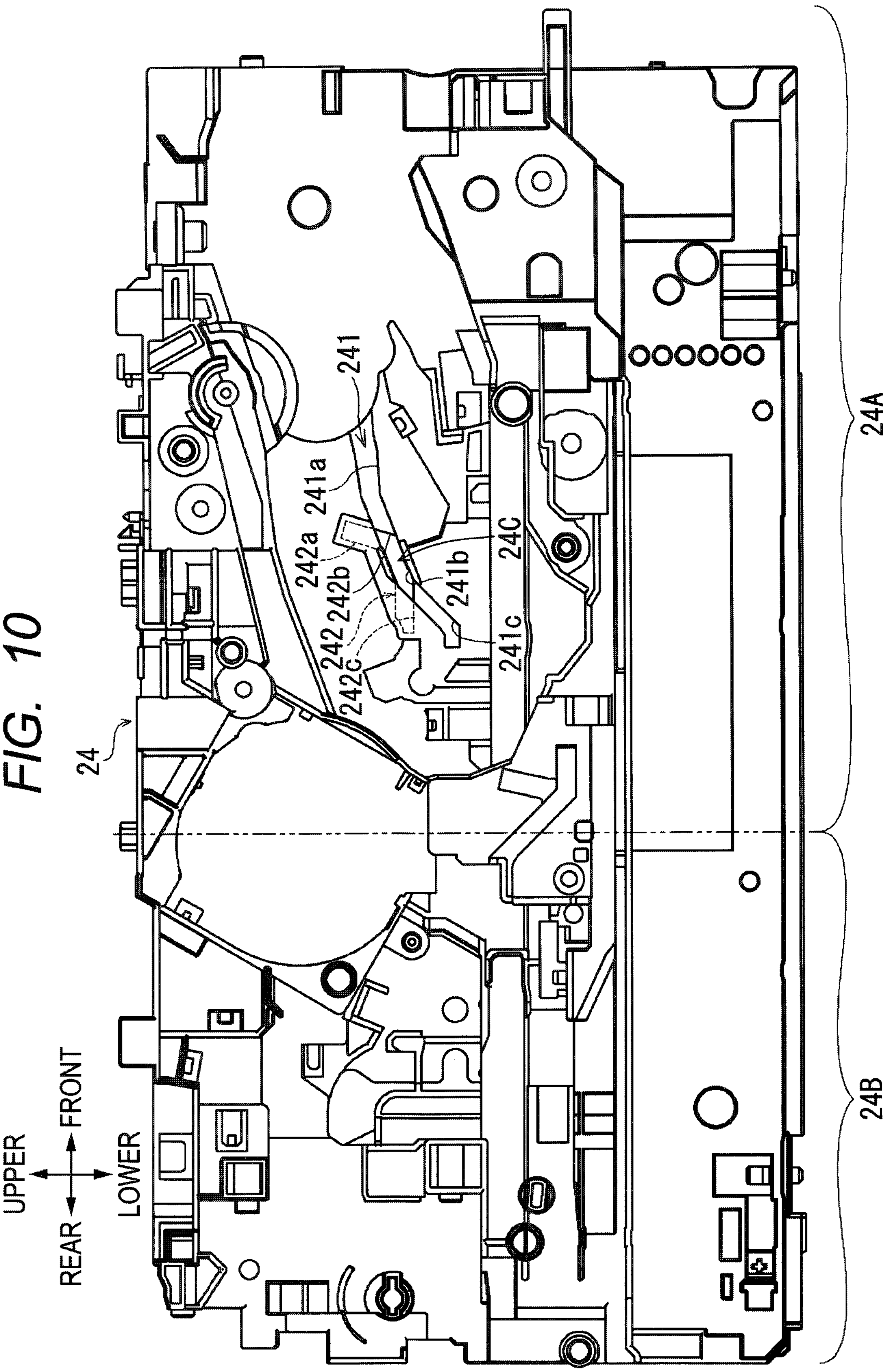
FIG. 10 is a side view showing a left side surface of a first main frame.
Figure 11:
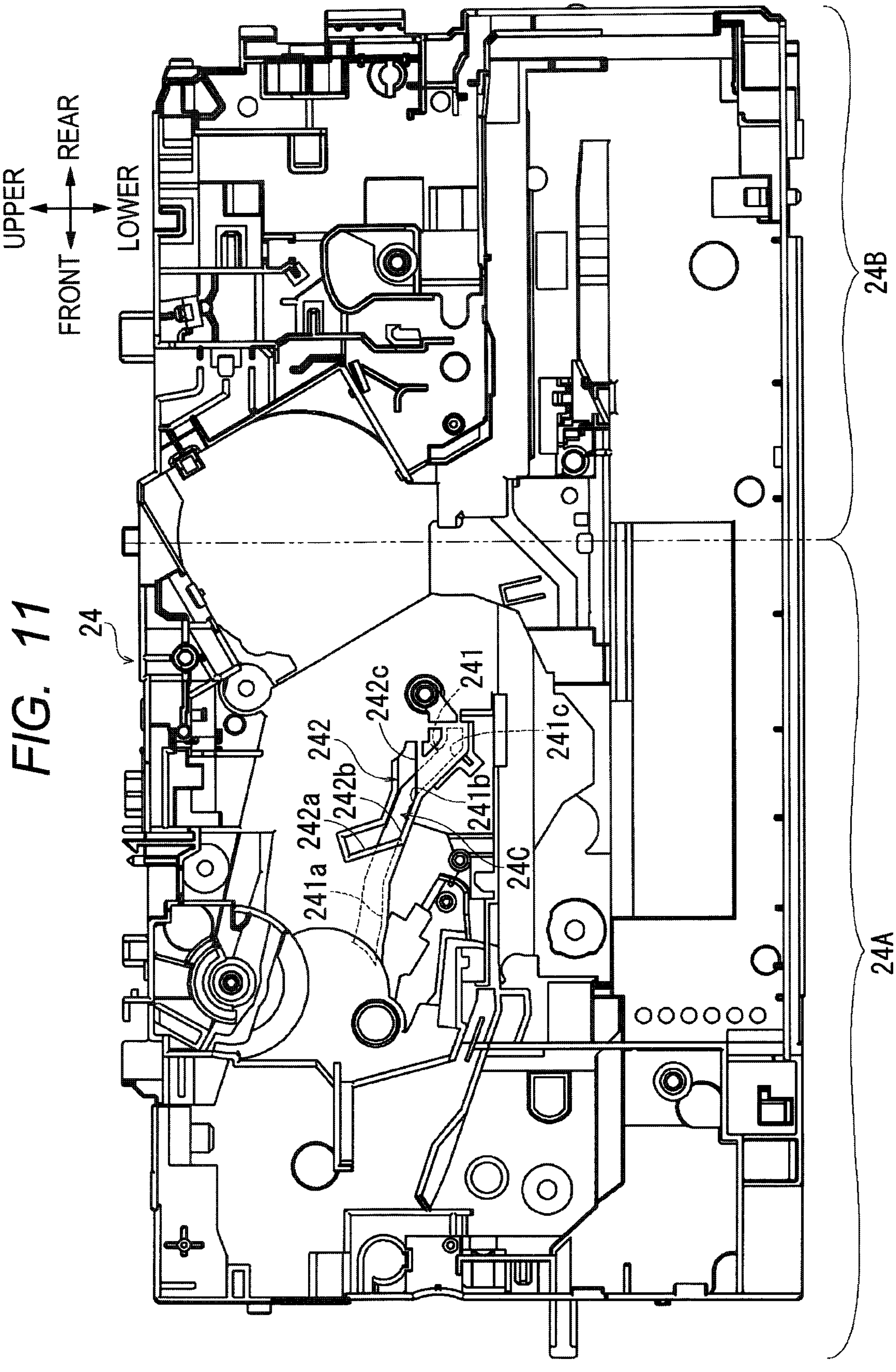
FIG. 11 is a side view showing a right side surface of the first main frame.

As shown in FIGS. 10 and 11, the first main frame 24 includes a front frame 24A located at the front and a rear frame 24B located at the rear of the front frame 24A. The front frame 24A and the rear frame 24B are integrally formed continuously in the front-rear direction. The front frame 24A of the first main frame 24 is an example of a frame.

The front frame 24A of the first main frame 24 includes a cartridge rail 241 and a contact piece rail 242. The cartridge rail 241 is formed in a groove shape with the left side opened. The cartridge rail 241 extends in the front-rear direction and is inclined in a direction in which the cartridge rail 241 is lowered from the front side toward the rear side.

The drum shaft 54*a* of the photosensitive drum 54 enters the cartridge rail 241, and the cartridge rail 241 guides the drum shaft 54*a* when the process cartridge 50 is attached to the apparatus main body 2 and when the process cartridge 50 is detached from the apparatus main body 2. The drum shaft 54*a* guided by the cartridge rail 241 enters the cartridge rail 241 from the left side. The process cartridge 50 is attached to the apparatus main body 2 from the front side toward the rear side, and is detached from the apparatus main body 2 from the rear side toward the front side.

As described above, the cartridge rail 241 of the front frame 24A guides the drum shaft 54*a* when the process cartridge 50 is attached to the apparatus main body 2 and when the process cartridge 50 is detached from the apparatus main body 2. The cartridge rail 241 is an example of a first guide groove configured to guide the drum shaft.

The contact piece rail 242 is formed in a groove shape with the right side open. The contact piece rail 242 extends in the front-rear direction and is inclined in a direction in which the contact piece rail 242 is lowered from the front side toward the rear side. The contact piece rail 242 is located on the right side of the cartridge rail 241 in the left-right direction. That is, the contact piece rail 242 is located outside of the cartridge rail 241 in the left-right direction.

The cartridge rail 241 has a front portion 241*a* located at the front, a rear portion 241*c* located at the rear, and a middle portion 241*b* located between the front portion 241*a* and the rear portion 241*c*. The contact piece rail 242 has a front portion 242*a* located at the front, a rear portion 242*c* located at the rear, and a middle portion 242*b* located between the front portion 242*a* and the rear portion 242*c*.

The middle portion 241*b* of the cartridge rail 241 and the middle portion 242*b* of the contact piece rail 242 overlap and are in communication with each other. The middle portion 241*b* and the middle portion 242*b* form a through hole 24C that penetrates the front frame 24A in the left-right direction.

That is, the middle portion 241*b* that is part of the cartridge rail 241 and the middle portion 242*b* that is part of the contact piece rail 242 overlap each other, and an overlapping portion of the cartridge rail 241 and the contact piece rail 242 is the through hole 24C. The cartridge rail 241 and the contact piece rail 242 partially overlap each other in this way, whereby a member forming the cartridge rail 241 and a member forming the contact piece rail 242 is made common.

The drum shaft 54*a* enters the through hole 24C of the cartridge rail 241 when the process cartridge 50 is attached to the apparatus main body 2 and when the process cartridge 50 is detached from the apparatus main body 2.

The front portion 242*a* of the contact piece rail 242 is located above the front portion 241*a* of the cartridge rail 241, and the rear portion 242*c* of the contact piece rail 242 is located above the rear portion 241*c* of the cartridge rail 241.

[Link]

As shown in FIGS. 6A, 6B, 12A, 12B and 13, the apparatus main body 2 includes a link 8. The link 8 is configured to contact the process cartridge 50 and moves the shutter 64 between the open position and the closed position. The link 8 is connected to the shutter 64. When the process cartridge 50 is attached to the apparatus main body 2, the link 8 contacts the process cartridge 50 to move the shutter 64 from the closed position to the open position. When the process cartridge 50 is detached from the apparatus main body 2, the link 8 contacts the process cartridge 50 to move the shutter 64 from the open position to the closed position.

That is, the link 8 is configured such that the shutter 64 opens and closes in accordance with the attachment and detachment of the process cartridge 50 to and from the apparatus main body 2. The link 8 is located on the opposite side of the process cartridge 50 attached to the apparatus main body 2 with respect to the front frame 24A of the first main frame 24 in the left-right direction.

The link 8 is movable to be located at a first position in a state before the process cartridge 50 is attached to the apparatus main body 2. When the link 8 is at the first position, the shutter 64 is at the closed position. The link 8 is movable to be located at a second position in a state after the process cartridge 50 is attached to the apparatus main body 2. When the link 8 is at the second position, the shutter 64 is at the open position. When the shutter 64 is moved from the closed position to the open position, the link 8 moves in a first direction from the first position toward the second position.

The link 8 includes a contact piece 80, a first rotational link 81, a linear motion link 82, a second rotational link 83, a third rotational link 84, a shutter link 85, and a coil spring 86. The linear motion link 82 is an example of a first link, and the first rotational link 81 is an example of a second link.

The contact piece 80 moves while contacting the drum shaft 54*a* of the photosensitive drum 54. The contact piece 80 is slidably fitted to the contact piece rail 242, and the contact piece rail 242 guides the contact piece 80 that moves in contact with the drum shaft 54*a*. The contact piece rail 242 is an example of a second guide groove that guides the contact piece.

Figure 14A:
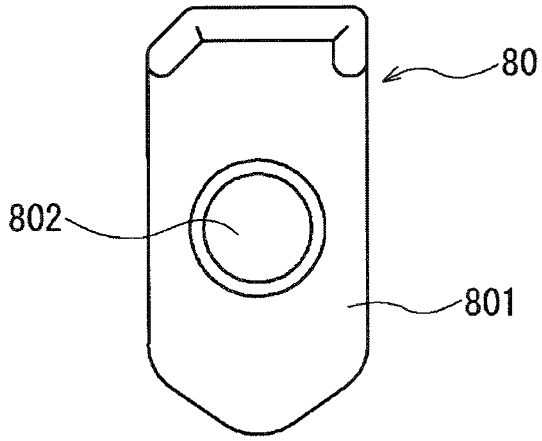
FIGS. 14A, 14B, and 14C are views showing a contact piece.
Figure 14B:
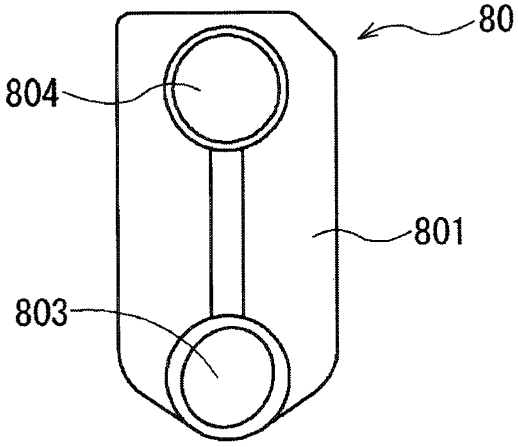
Figure 14C:
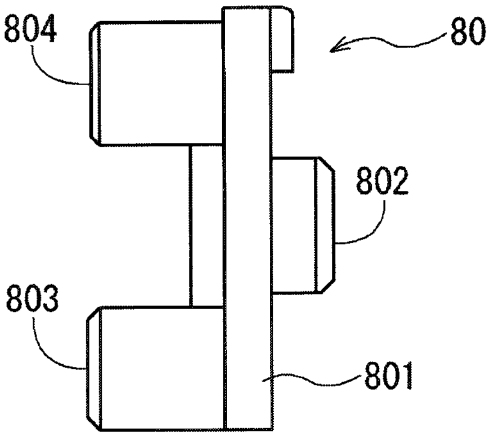

As shown in FIGS. 14A, 14B and 14C, the contact piece 80 includes a main body portion 801, a coupling portion 802, a first boss 803, and a second boss 804. The main body portion 801 is formed of a plate-like member having plate surfaces facing in the left-right direction. The coupling portion 802 is a protrusion that protrudes rightward from a right surface of the main body portion 801.

The first boss 803 and the second boss 804 are protrusions that protrude leftward from a left surface of the main body portion 801. The first boss 803 and the second boss 804 enter the contact piece rail 242 of the first main frame 24 from the right side and are guided by the contact piece rail 242.

In a state where the first boss 803 and the second boss 804 enter the contact piece rail 242, the second boss 804 is located upstream of the first boss 803 in an attaching direction of the process cartridge 50 with respect to the apparatus main body 2. The attaching direction is a direction in which the process cartridge 50 inserted into the apparatus main body 2 moves toward an attached position when the process cartridge 50 is attached to the apparatus main body 2.

The contact piece 80 is located on the opposite side of the process cartridge 50 attached to the apparatus main body 2 with respect to the front frame 24A of the first main frame 24. In a state where the first boss 803 and the second boss 804 enter the contact piece rail 242, the first boss 803 and the second boss 804 are located so as not to protrude toward the process cartridge 50 beyond the front frame 24A of the first main frame 24.

The first boss 803 contacts the drum shaft 54*a* when the process cartridge 50 is attached to the apparatus main body 2, and the second boss 804 contacts the drum shaft 54*a* when the process cartridge 50 is detached from the apparatus main body 2. That is, the first boss 803 contacts the drum shaft 54*a* of the process cartridge 50 that is being attached to the apparatus main body 2, and the second boss 804 contacts the drum shaft 54*a* of the process cartridge 50 that is being detached from the apparatus main body 2.

In this case, when the first boss 803 is located at the middle portion 242*b* (the through hole 24C) of the contact piece rail 242, the first boss 803 contacts, via the through hole 24C, the drum shaft 54*a* of the process cartridge 50 that is being attached to the apparatus main body 2. When the second boss 804 is located at the middle portion 242*b* (the through hole 24C) of the contact piece rail 242, the second boss 804 contacts, via the through hole 24C, the drum shaft 54*a* of the process cartridge 50 that is being detached from the apparatus main body 2.

The drum shaft 54*a* that contacts the first boss 803 and the second boss 804 via the through hole 24C may contact the first boss 803 and the second boss 804 inside the through hole 24C, or may contact the first boss 803 and the second boss 804 at a position that is further rightward than the through hole 24C in the left-right direction.

In the present embodiment, the contact piece 80 is configured to move in contact with the drum shaft 54*a*. Alternatively, a cartridge protrusion that protrudes toward the first main frame 24 may be formed on the process cartridge 50 separately from the drum shaft 54*a*, and the contact piece 80 may be configured to move in contact with the cartridge protrusion.

The first rotational link 81 is a substantially linear member rotatably coupled to the contact piece 80. The first rotational link 81 is located on the right side of the front frame 24A of the first main frame 24 in the left-right direction. The first rotational link 81 includes a fitting portion 811 which is located at a front end portion and to which the coupling portion 802 of the contact piece 80 is rotatably fitted, and a boss 812 which is located at a rear end portion and which protrudes leftward. The first rotational link 81 is disposed in an inclined posture in which the fitting portion 811 is located above and forward of the boss 812. The first rotational link 81 is coupled to the contact piece 80 by fitting the coupling portion 802 into the fitting portion 811, and rotates in accordance with the movement of the contact piece 80.

The linear motion link 82 is a substantially linear member that is rotatably coupled to the first rotational link 81 and extends in the front-rear direction. The linear motion link 82 is located on the right side of the front frame 24A of the first main frame 24 in the left-right direction. The linear motion link 82 includes a fitting portion 821 which is located at a front end portion and to which the boss 812 of the first rotational link 81 is rotatably fitted, and a coupling hole 822 which is located at a rear end portion. The linear motion link 82 is coupled to the first rotational link 81 by fitting the boss

812 to the fitting portion 821, and moves linearly in the front-rear direction in accordance with the rotation of the first rotational link 81.

When the link 8 moves the shutter 64 from the closed position to the open position, the linear motion link 82 moves from the front to the rear. That is, in the present embodiment, the first direction of the linear motion link 82 is the rearward direction.

The second rotational link 83 is coupled to the linear motion link 82 and is supported by the first main frame 24. The second rotational link 83 includes a support portion 831 rotatably supported by the first main frame 24, a first arm 832 extending substantially downward from the support portion 831, and a second arm 833 extending substantially upward from the support portion 831. An engagement pin **832*a* protruding leftward is formed at a distal end of the first arm 832, and a coupling hole 833*a* is formed at a distal end of the second arm 833**.

The engagement pin **832*a* of the first arm 832 enters the coupling hole 822 of the linear motion link 82 from the right side, and engages with the coupling hole 822 due to the movement of the linear motion link 82 in the front-rear direction. The second rotational link 83 is coupled to the linear motion link 82 by the engagement of the engagement pin 832*a* and the coupling hole 822, and rotates about the support portion 831 in accordance with the movement of the linear motion link 82**.

The third rotational link 84 is coupled to the second rotational link 83 and is rotatably supported by the support shaft 65 of the fuser 6. The third rotational link 84 includes a support portion 841 rotatably supported by the support shaft 65, an engagement pin 842 protruding rightward from the support portion 841, an operation cam 843 formed in a phase different from the engagement pin 842 in the circumferential direction of the support portion 841, and a coupling hole 844 formed in the operation cam 843. The coupling hole 844 is formed to penetrate the operation cam 843 along the left-right direction.

The engagement pin 842 of the third rotational link 84 enters the coupling hole **833*a* of the second rotational link 83 from the left side, and engages with the coupling hole 833*a* due to the rotation of the second rotational link 83. The third rotational link 84 is coupled to the second rotational link 83 by the engagement of the engagement pin 842 and the coupling hole 833*a*, and rotates about the support shaft 65 in accordance with the rotation of the second rotational link 83**.

As shown in FIGS. 5A, 5B, 6A and 6B, the shutter link 85 is coupled to the third rotational link 84 and is rotatably supported by the support shaft 65 of the fuser 6. The shutter link 85 moves in accordance with the movement of the third rotational link 84 to move the shutter 64 of the fuser 6 between the closed position and the open position. The shutter link 85 is located at the right end of the fuser 6. The shutter link 85 includes a support portion 851, an arm portion 852, an engagement portion 853, and an engagement pin 854.

The support portion 851 is rotatably supported by the support shaft 65 protruding rightward from a right end portion of the fixing frame 63. The arm portion 852 is an arm member extending forward from the support portion 851. The engagement portion 853 is located at a front end of the arm portion 852 and has an engagement hole **853*a* having an oval shape elongated in the front-rear direction. A coupling shaft 642 protruding rightward from the right end of the shutter 64 engages with the engagement hole 853*a***.

The shutter link 85 is rotatable about the support portion 851 in a direction in which the engagement portion 853 moves up and down. The shutter 64 is located at the closed position in a state where the shutter link 85 is rotated and the engagement portion 853 has moved downward (see FIGS. 5A and 6A). The shutter 64 is located at the open position in a state where the shutter link 85 is rotated and the engagement portion 853 has moved upward (see FIGS. 5B and 6B).

The engagement pin 854 protrudes rightward from an end portion of the arm portion 852 on the support portion 851 side. The engagement pin 854 of the shutter link 85 enters the coupling hole 844 of the third rotational link 84 from the left side.

The coil spring 86 is supported by the support portion 841 of the third rotational link 84. The coil spring 86 has an arm portion 861. The arm portion 861 extends from an inner diameter side of the coupling hole 844 toward an outer diameter side, and enters the coupling hole 844.

The arm portion 861 is located above the engagement pin 854 in the coupling hole 844. The coil spring 86 is rotatable along with the rotation of the third rotational link 84. A lower edge of the coupling hole 844 in the operation cam 843 of the third rotational link 84 forms an engagement surface **844*a*. The engagement surface 844*a* is located below the engagement pin 854**.

The engagement surface **844*a* of the coupling hole 844 engages with the engagement pin 854 due to rotation of the third rotational link 84 in a direction in which the operation cam 843 moves upward. The arm portion 861 of the coil spring 86 engages with the engagement pin 854 due to rotation of the third rotational link 84 in a direction in which the operation cam 843** moves downward.

The shutter link 85 is coupled to the third rotational link 84 by the engagement of the engagement pin 854 with the arm portion 861 or the engagement surface **844*a*, and moves in accordance with the rotation of the third rotational link 84 to move the shutter 64** between the closed position and the open position.

In the image forming apparatus 1, when the process cartridge 50 is attached to or detached from the apparatus main body 2, the contact piece 80 of the link 8 contacts the drum shaft **54*a* and moves along the contact piece rail 242, whereby a force is transmitted to the shutter 64 via the link 8 and the shutter 64** moves between the closed position and the opened position.

In the present embodiment, the link 8 includes the contact piece 80, the first rotational link 81, the linear motion link 82, the second rotational link 83, the third rotational link 84, the shutter link 85, and the coil spring 86. However, the present disclosure is not limited to this, and the link 8 may be formed of a single link that is coupled to the shutter 64 and contacts the process cartridge 50 to open and close the shutter 64. Further, the movement of the link 8 is not limited to rotation or sliding, and may be any movement as long as the shutter 64 is opened and closed by an appropriate operation in accordance with attaching and detaching of the process cartridge 50.

[Presser]

Figure 12A:
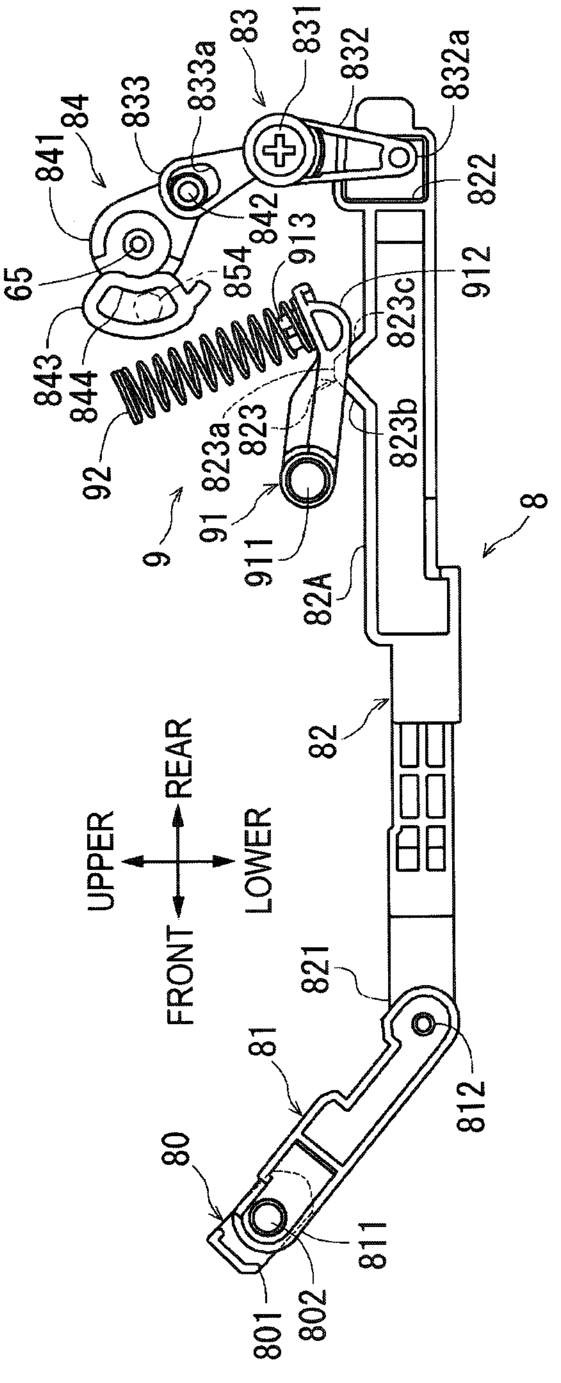
FIGS. 12A and 12B are side views showing a link.
Figure 12B:
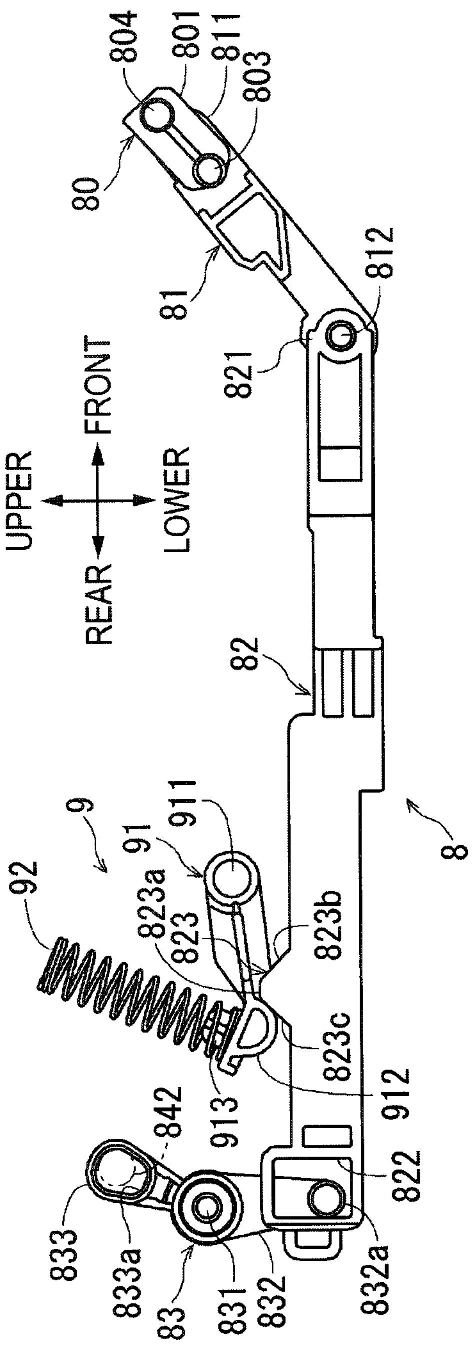

FIGS. 12A and 12B are side views showing the link 8 in a state where the first boss 803 of the contact piece 80 is located at the middle portion **242*b* of the contact piece rail 242 and the second boss 804 is located at the front portion 242*a* of the contact piece rail 242. As shown in FIGS. 12A and 12B, the apparatus main body 2 includes a presser (pressing portion) 9. In a process in which the link 8 moves the shutter 64 from the closed position to the open position, the presser 9 presses the link 8 in a direction in which the shutter 64 moves to the open position before the shutter 64 reaches the open position. The presser 9 presses the link 8 to restrict the movement of the link 8 that has moved the shutter 64** to the open position or the closed position.

The presser 9 includes a pressing spring 92 and a pressing arm 91 that is pressed by the pressing spring 92 and contacts an upper surface 82A of the linear motion link 82. The pressing spring 92 presses a distal end of the pressing arm 91 toward the upper surface 82A of the linear motion link 82. The upper surface 82A of the linear motion link 82 is an example of a pressed surface that is pressed by the pressing arm.

The pressing arm 91 includes a support portion 911 which is located at a base end of the pressing arm 91 and is rotatably supported by the first main frame 24, a contact portion 912 which is located at a distal end of the pressing arm 91 and contacts the upper surface 82A of the linear motion link 82, and a fitting portion 913 to which the pressing spring 92 is fitted. The pressing arm 91 extends in the front-rear direction, and the support portion 911 is located at the front end and the contact portion 912 is located at the rear end. The fitting portion 913 is located above the contact portion 912. The contact portion 912 is rotatable about the support portion 911 up and down.

The pressing spring 92 is supported by the first main frame 24, and a lower end of the pressing spring 92 is fitted to the fitting portion 913 of the pressing arm 91. The pressing spring 92 urges the contact portion 912 of the pressing arm 91 toward the lower side which is the upper surface 82A side of the linear motion link 82, and the contact portion 912 is pressed against the upper surface 82A from above.

The upper surface 82A of the linear motion link 82 has a link protrusion 823 protruding toward the upper side which is the presser 9 side, between the fitting portion 821 and the coupling hole 822. The link protrusion 823 is formed in a mountain shape having a first pressed surface 823*a*, a second pressed surface 823*b*, and a third pressed surface 823*c*.

The first pressed surface 823*a* is located at the vertex of the mountain shape and extends horizontally. The second pressed surface 823*b* is located forward of the first pressed surface 823*a* and is formed as an inclined surface that rises toward the rear. That is, the second pressed surface 823*b* is inclined from the lower side to the upper side along the rearward direction. The rear end of the second pressed surface 823*b* is connected to the front end of the first pressed surface 823*a*.

The third pressed surface 823*c* is located rearward of the first pressed surface 823*a* and is formed as an inclined surface that descends toward the rear. That is, the third pressed surface 823*c* is inclined from the upper side toward the lower side along the rearward direction. The front end of the third pressed surface 823*c* is connected to the rear end of the first pressed surface 823*a*. The third pressed surface 823*c* is located on the opposite side of the second pressed surface 823*b* with respect to the first pressed surface 823*a* in the front-rear direction.

The linear motion link 82 is movable in the front-rear direction to be located at a position where the contact portion 912 of the pressing arm 91 presses the first pressed surface 823*a*, a position where the contact portion 912 of the pressing arm 91 presses the second pressed surface 823*b*, and a position where the contact portion 912 of the pressing arm 91 presses the third pressed surface 823*c*.

The first pressed surface 823*a* is a horizontally extending surface. Thus, when the pressing arm 91 presses the first pressed surface 823*a* from above, the pressing force of the pressing arm 91 neither acts in a rearward direction in which the linear motion link 82 moves toward the second position nor a forward direction in which the linear motion link 82 moves toward the first position.

The second pressed surface 823*b* is a surface inclined from the lower side toward the upper side along the rearward direction. Thus, when the pressing arm 91 presses the second pressed surface 823*b* from above, the pressing force of the pressing arm 91 acts in the rearward direction in which the linear motion link 82 moves toward the second position. In a state where the pressing arm 91 presses the second pressed surface 823*b* from above, the contact portion 912 of the pressing arm 91 and the second pressed surface 823*b* engage with each other, and the forward movement of the linear motion link 82 is restricted.

The third pressed surface 823*c* is a surface inclined from the upper side toward the lower side along the rearward direction. Thus, when the pressing arm 91 presses the third pressed surface 823*c* from above, the pressing force of the pressing arm 91 acts in the forward direction in which the linear motion link 82 moves toward the first position. In a state where the pressing arm 91 presses the third pressed surface 823*c* from above, the contact portion 912 of the pressing arm 91 and the third pressed surface 823*c* engage with each other, and the rearward movement of the linear motion link 82 is restricted.

[Operation of Link]

Next, an operation of the link 8 will be described.

(Operation when Process Cartridge is Attached)

First, an operation of the link 8 when the process cartridge 50 is attached to the apparatus main body 2 will be described.

Figure 13:
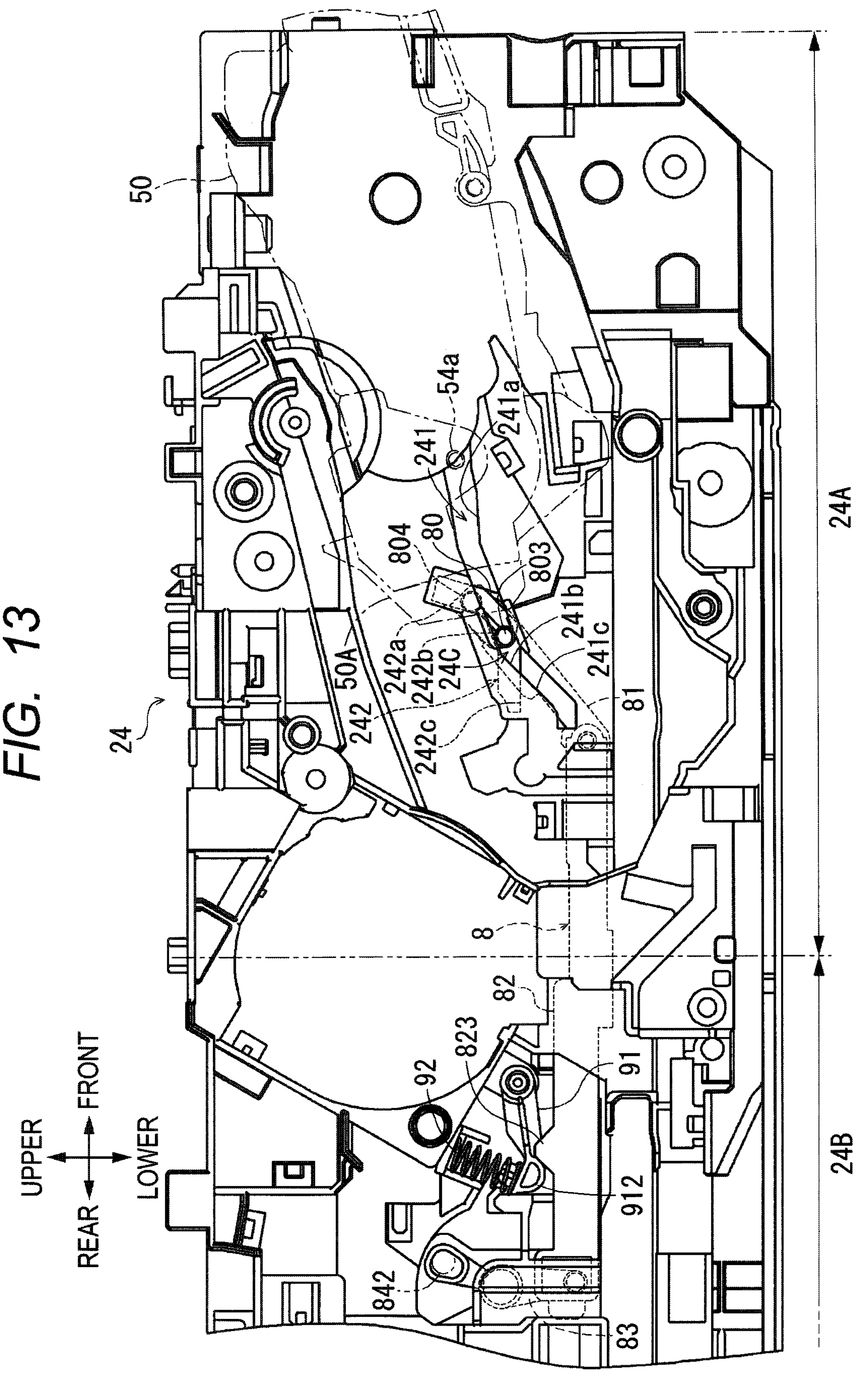
FIG. 13 is a side view of the first main frame.

FIG. 13 is a side view of the first main frame 24 in a state where the process cartridge 50 is located at an attaching start position, the first boss 803 of the contact piece 80 is located at the middle portion 242*b* of the contact piece rail 242, and the second boss 804 is located at the front portion 242*a* of the contact piece rail 242. As shown in FIGS. 12A, 12B and 13, in a state where the process cartridge 50 is detached from the apparatus main body 2 and is not yet attached to the apparatus main body 2 and a front end 50A of the process cartridge 50 in an insertion direction is at the attaching start position (a position shown in FIG. 13), the drum shaft 54*a* is separated forward from the contact piece 80, and the contact piece 80 is located between the front portion 242*a* and the middle portion 242*b* of the contact piece rail 242.

In particular, the contact piece 80 is fitted to the contact piece rail 242 in a state where the first boss 803 is located at the middle portion 242*b* (the through hole 24C) of the contact piece rail 242 and the second boss 804 is located at the front portion 242*a* of the contact piece rail 242. The insertion direction of the process cartridge 50 is the same as the attaching direction.

Figure 6A:
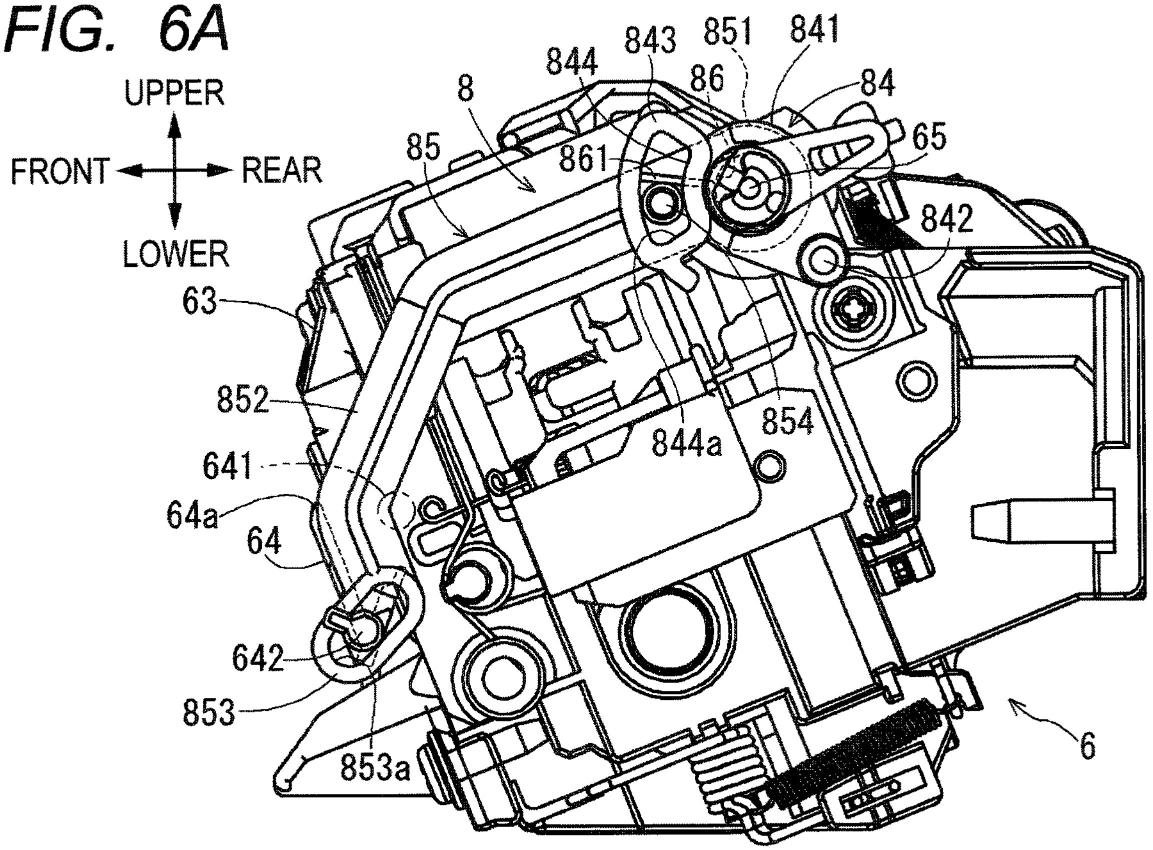
FIG. 6A is a side view showing the fuser in a state where the shutter is at the closed position.

When the contact piece 80 is located at the position shown in FIG. 13, as shown in FIG. 6A, the shutter 64 is in a state of having been moved to the closed position by the link 8. The shutter 64 suppresses soiling of the fuser 6 by being touched by the user's hand in a state where the process cartridge 50 is detached from the apparatus main body 2.

When the contact piece 80 is located at the position shown in FIG. 13, as shown in FIGS. 12A and 12B, the contact portion 912 of the pressing arm 91 contacts the third pressed surface 823*c* of the linear motion link 82, which restricts rearward movement of the linear motion link 82. Thus, the linear motion link 82 is fixed by the presser 9 in a state where the shutter 64 is moved to the closed position by the link 8, and the shutter 64 is not moved from the closed position to the opened position unintentionally. Thus, the closed position of the shutter 64 is stably held.

Further, the contact piece rail 242 of the front frame 24A for guiding the contact piece 80 is located outside the cartridge rail 241 in the left-right direction, and the first boss 803 and the second boss 804 of the contact piece 80 are located so as not to protrude toward the process cartridge 50 from the front frame 24A. This suppresses the shutter 64 being unintentionally opened due to unintentional movement of the contact piece 80 (and the link 8) in a state where the process cartridge 50 is detached from the apparatus main body 2.

Figure 15:
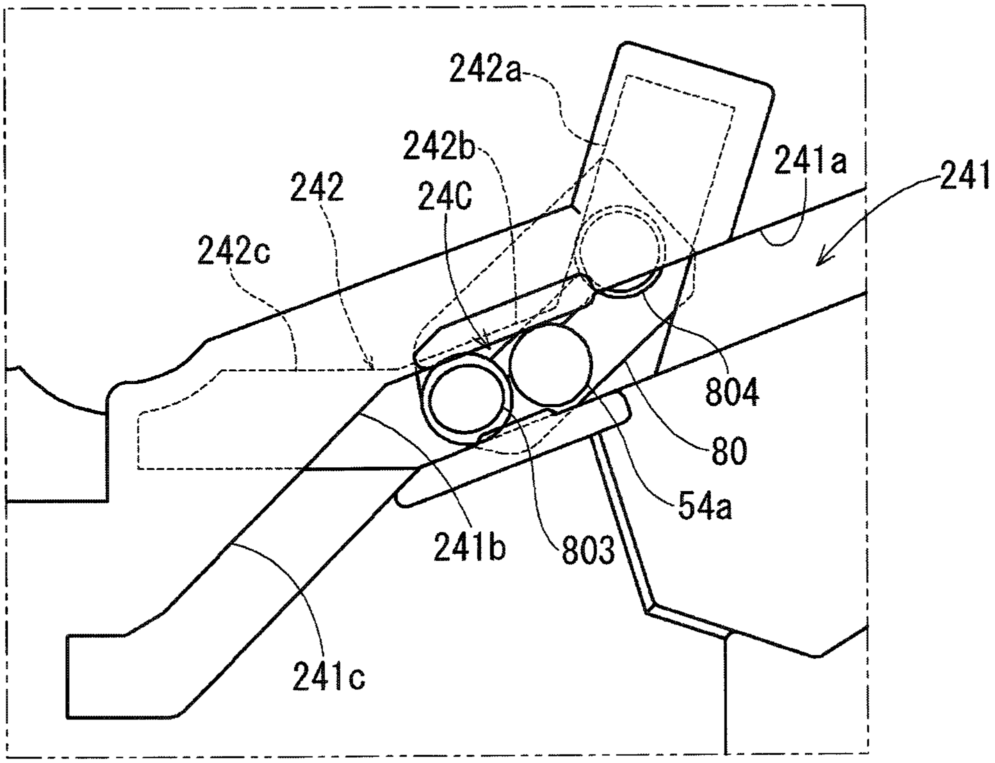
FIG. 15 is an enlarged side view showing a drum shaft and the contact piece.

FIG. 15 is an enlarged side view showing a state where the drum shaft 54*a* having entered the middle portion 241*b* of the cartridge rail 241 contacts the first boss 803 of the contact piece 80. When the process cartridge 50 at the attaching start position is further inserted toward the attached position, the drum shaft 54*a* enters the front portion 241*a* of the cartridge rail 241 and moves in the cartridge rail 241. As shown in FIG. 15, when the drum shaft 54*a* moving in the cartridge rail 241 enters the middle portion 241*b* (the through hole 24C), the drum shaft 54*a* contacts the first boss 803 of the contact piece 80.

Figure 16A:
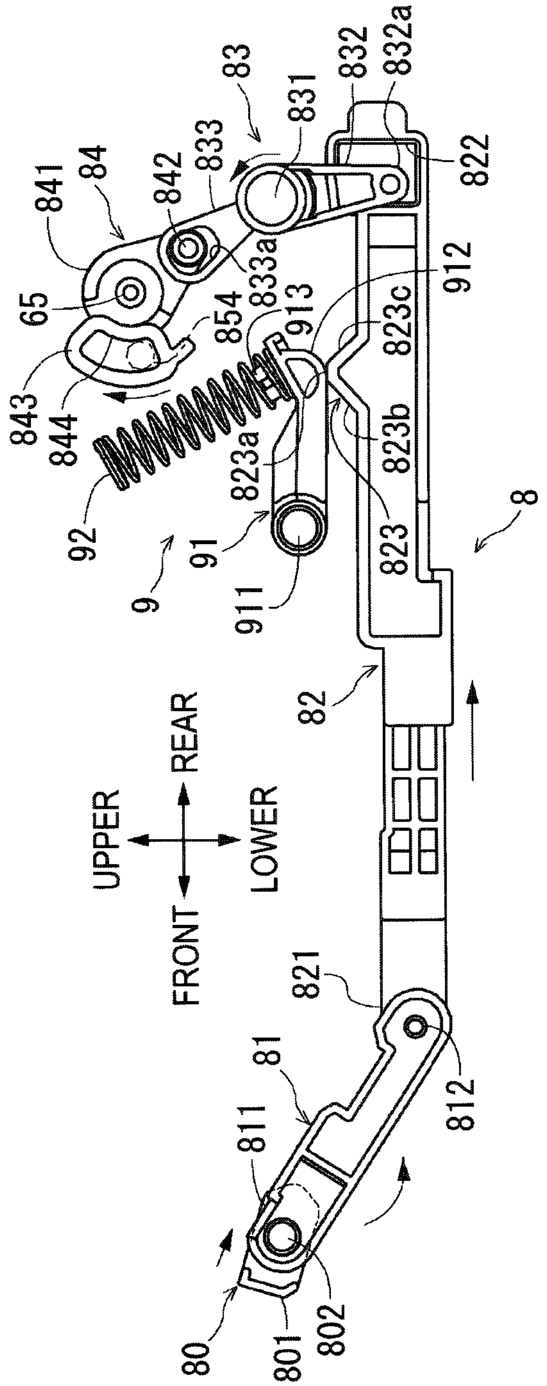
FIGS. 16A and 16B are side views showing the link.
Figure 16B:
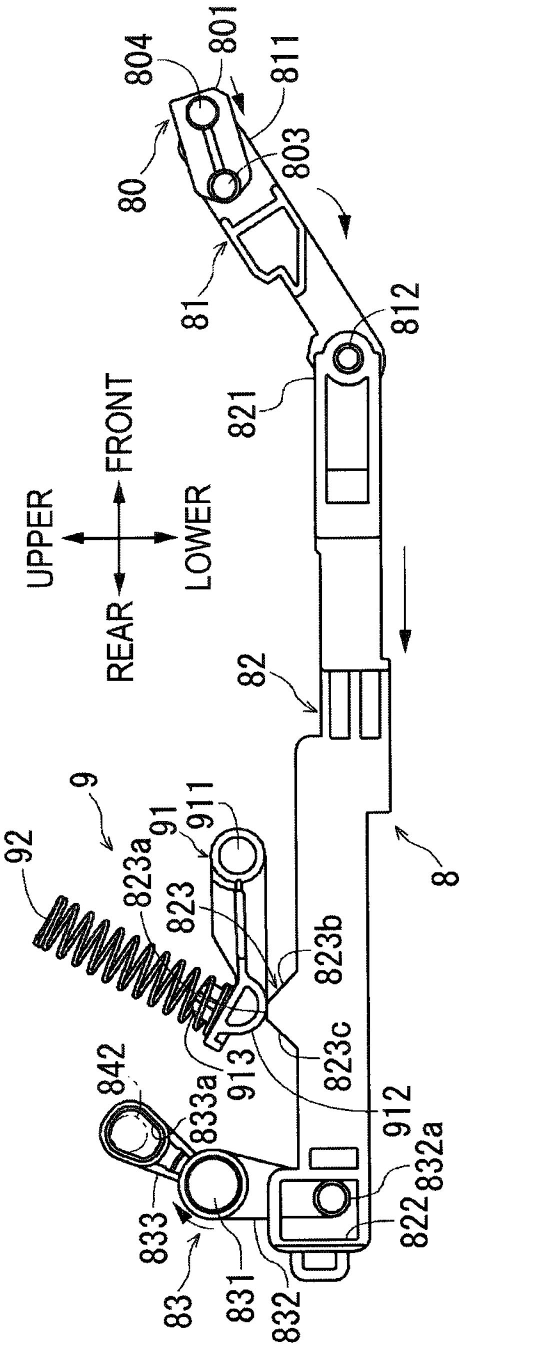
Figure 17:
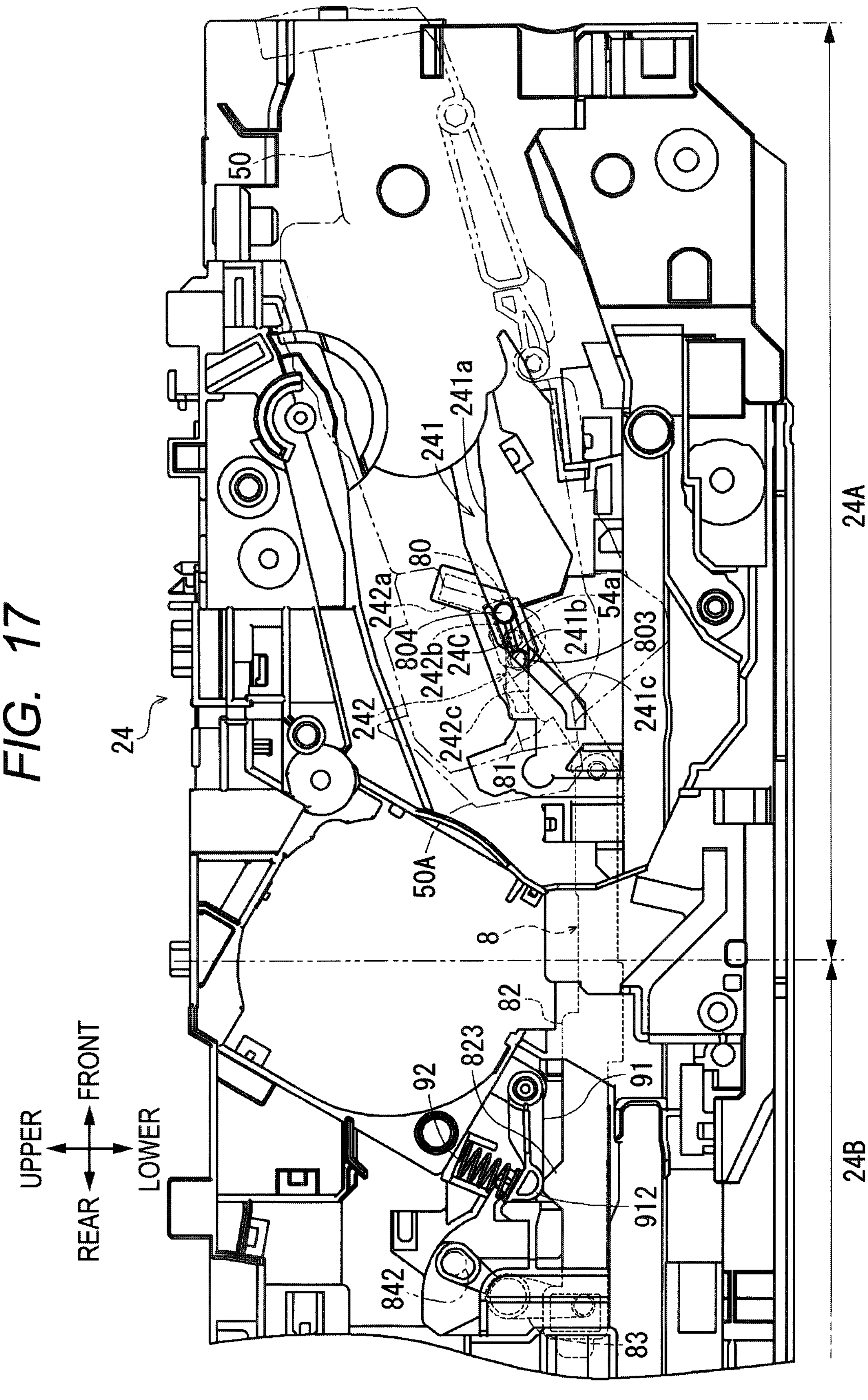
FIG. 17 is a side view showing the first main frame.
Figure 18:
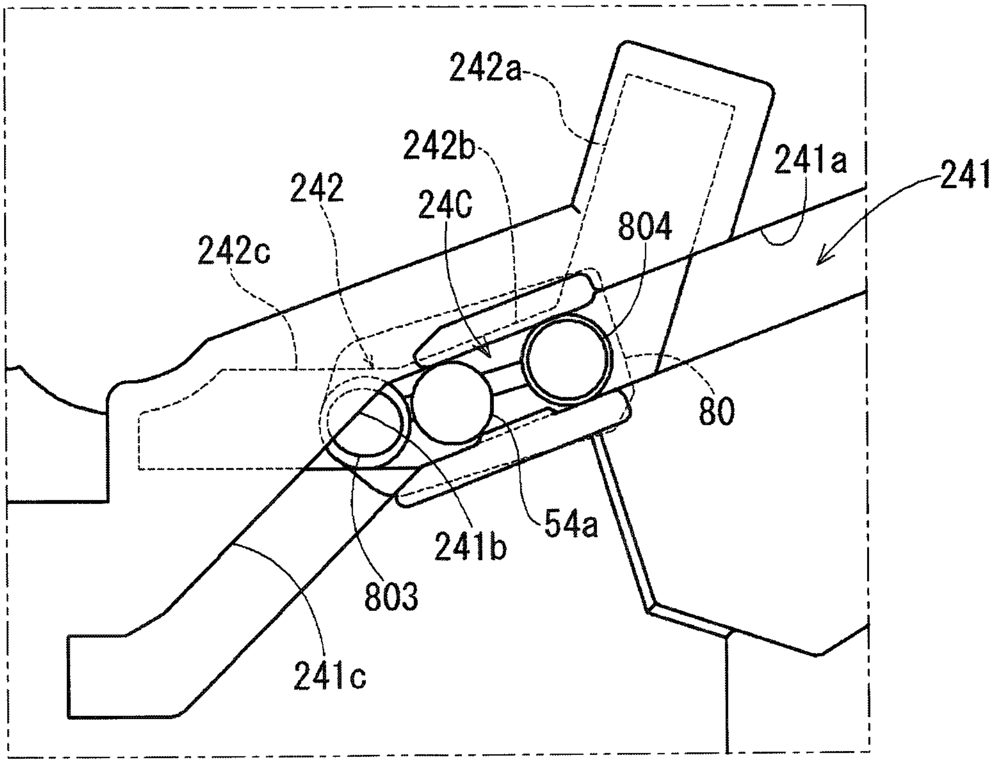
FIG. 18 is an enlarged side view showing the drum shaft and the contact piece.

FIGS. 16A and 16B are side views showing the link 8 in a state where the drum shaft 54*a* contacts the contact piece 80, a part of the rear of the first boss 803 of the contact piece 80 is located at the rear portion 242*c* of the contact piece rail 242, and the second boss 804 is located at the middle portion 242*b* of the contact piece rail 242. FIG. 17 is a side view showing the first main frame 24 in a state where the drum shaft 54*a* contacts the contact piece 80, a part of the rear of the first boss 803 of the contact piece 80 is located at the rear portion 242*c* of the contact piece rail 242, and the second boss 804 is located at the middle portion 242*b* of the contact piece rail 242. FIG. 18 is an enlarged side view showing a state where the drum shaft 54*a* contacts the contact piece 80, a part of the rear of the first boss 803 of the contact piece 80 is located at the rear portion 242*c* of the contact piece rail 242, and the second boss 804 is located at the middle portion 242*b* of the contact piece rail 242. As shown in FIGS. 16A, 16B, 17 and 18, the contact piece 80 which contacts the drum shaft 54*a* moving in the middle portion 241*b* (the through hole 24C) of the cartridge rail 241 is pressed by the drum shaft 54*a* and moves to the downstream side in the attaching direction of the process cartridge 50.

When the first boss 803 of the contact piece 80 has moved while contacting the drum shaft 54*a* moving in the middle portion 241*b* (the through hole 24C), a rear portion of the first boss 803 is located in the rear portion 242*c* of the contact piece rail 242 and the other portion of the first boss 803 is located in the middle portion 242*b* (the through hole 24C) of the contact piece rail 242. The second boss 804 is located at the middle portion 242*b* (the through hole 24C) of the contact piece rail 242.

When the contact piece 80 moves, the first rotational link 81 coupled to the contact piece 80 moves rearward while rotating in a direction in which the inclination angle with respect to the horizontal direction decreases. When the first rotational link 81 rotates and moves, the linear motion link 82 coupled to the first rotational link 81 moves linearly rearward.

When the linear motion link 82 moves rearward, the coupling hole 822 of the linear motion link 82 and the engagement pin 832*a* of the second rotational link 83 engage with each other, and the second rotational link 83 rotates in a direction in which the engagement pin 832*a* moves rearward. When the second rotational link 83 rotates, the coupling hole 833*a* of the second rotational link 83 and the engagement pin 842 of the third rotational link 84 engage with each other, and the third rotational link 84 rotates in a direction in which the engagement pin 842 moves forward.

In this case, the linear motion link 82 moves rearward, and thus the contact portion 912 of the pressing arm 91 in the presser 9 moves up the third pressed surface 823*c* of the linear motion link 82 against the pressing force of the pressing spring 92, and rides on the first pressed surface 823*a* from the third pressed surface 823*c*. That is, when the process cartridge 50 is attached to the apparatus main body 2, the pressing arm 91 contacts the first pressed surface 823*a* after contact with the third pressed surface 823*c*. In a state where the pressing arm 91 contacts the first pressed surface 823*a* which is a horizontally extending surface, the restriction to movement of the shutter 64 from the closed position to the open position by the presser 9 is released.

As described above, when the process cartridge 50 is attached to the apparatus main body 2, the linear motion link 82 moves rearward in the first direction against the pressing force from the pressing arm 91, and thus the shutter 64 is switched from a state of being held at the closed position to a state of being movable to the open position.

Figure 19A:
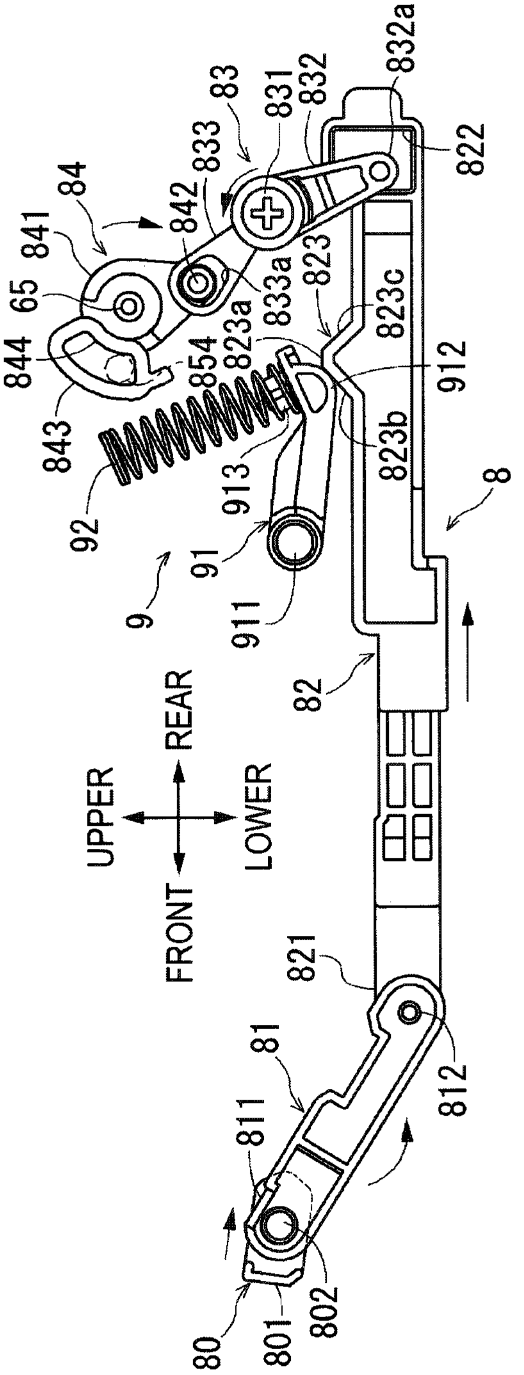
FIGS. 19A and 19B are side views showing the link.
Figure 19B:
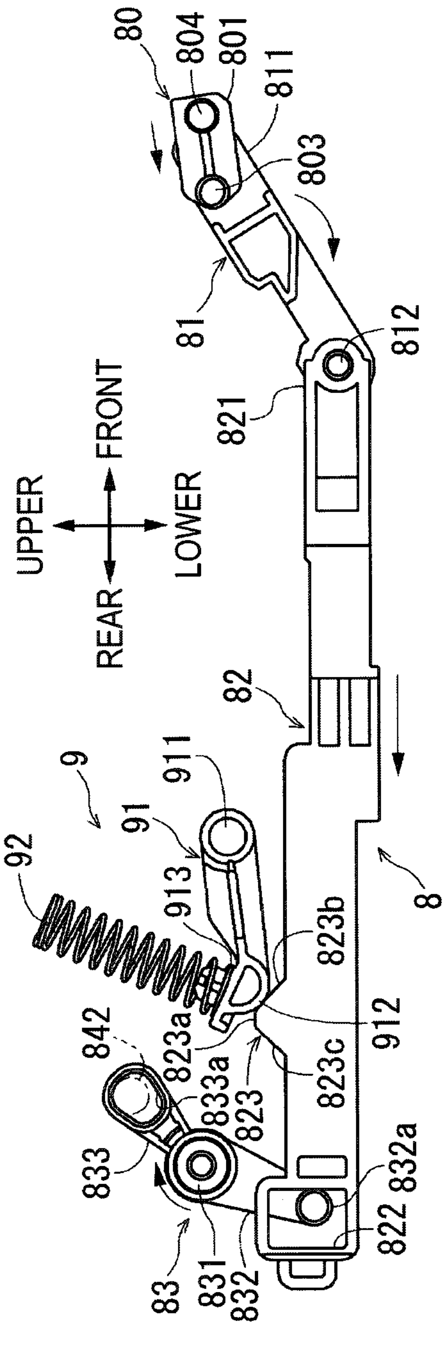
Figure 20:
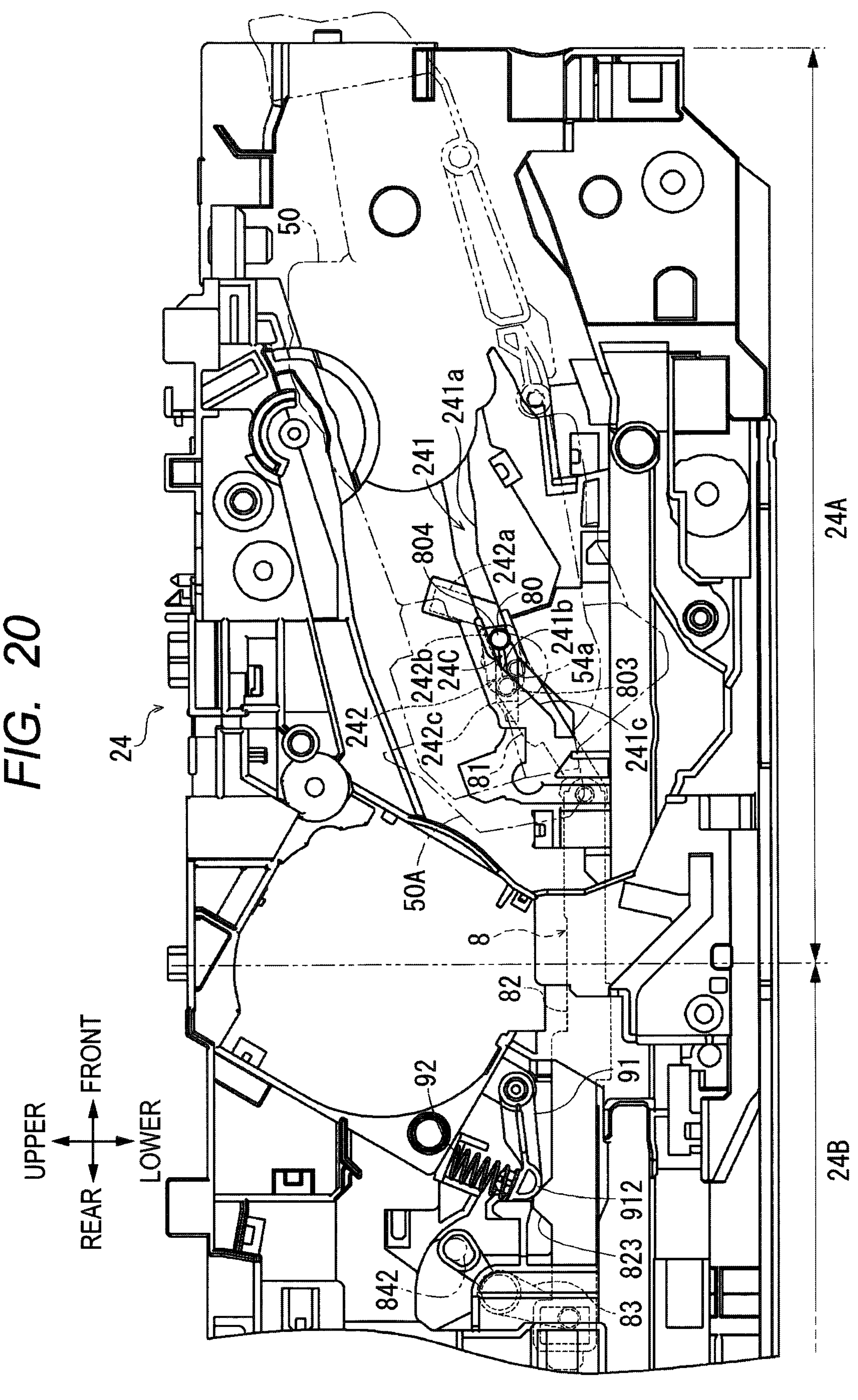
FIG. 20 is a side view showing the first main frame.

FIGS. 19A and 19B are side views showing the link in a state where the drum shaft 54*a* contacts the contact piece 80, the first boss 803 of the contact piece 80 is located at the rear portion 242*c* of the contact piece rail 242, and the second boss 804 is located at the middle portion 242*b* of the contact piece rail 242. FIG. 20 is a side view showing the first main frame 24 in a state where the drum shaft 54*a* contacts the contact piece 80, the first boss 803 of the contact piece 80 is located at the rear portion 242*c* of the contact piece rail 242, and the second boss 804 is located at the middle portion 242*b* of the contact piece rail 242. As shown in FIGS. 19A, 19B and 20, when the process cartridge 50 is further inserted from the position shown in FIG. 17 toward the attached position, the contact piece 80 is further moved to the downstream side in the attaching direction by the drum shaft 54*a* moving in the middle portion 241*b* (the through hole 24C) of the cartridge rail 241. In FIG. 20, the first boss 803 of the contact piece 80 is located at the rear portion 242*c* of the contact piece rail 242, and the second boss 804 is located at the middle portion 242*b* (the through hole 24C) of the contact piece rail 242.

Figure 21:
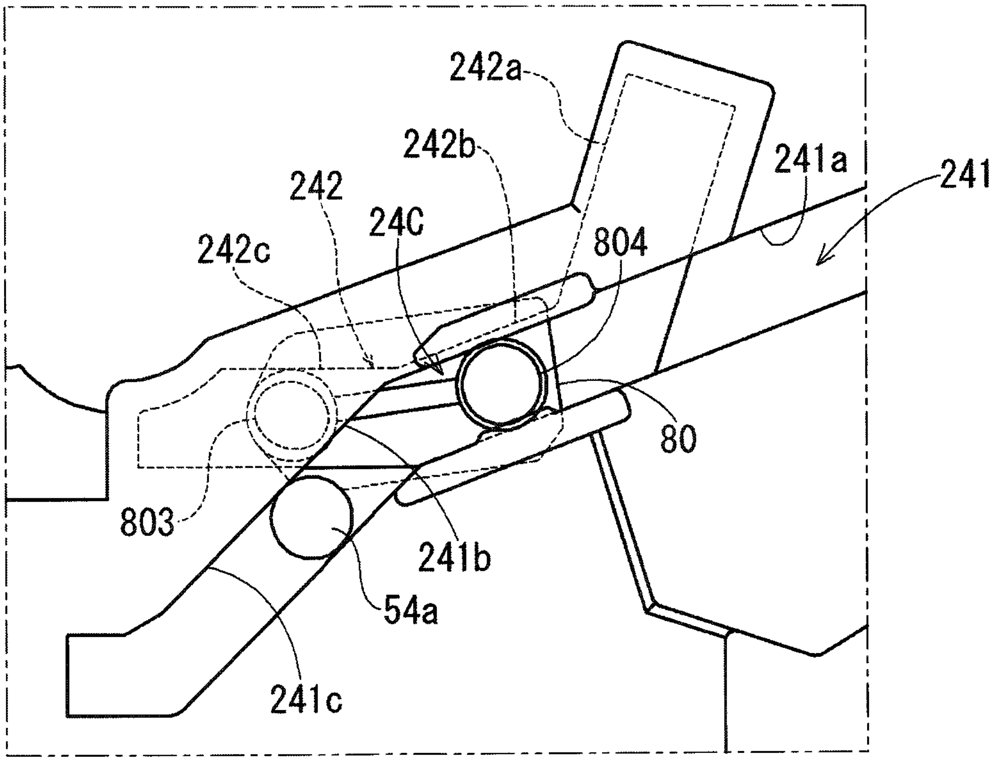
FIG. 21 is an enlarged side view showing the drum shaft and the contact piece.

FIG. 21 is an enlarged side view showing a state where the drum shaft 54*a* is moved from the middle portion 241*b* to the rear portion 241*c* of the cartridge rail 241, and the contact piece 80 and the drum shaft 54*a* are separated from each other. As shown in FIG. 21, the drum shaft 54*a* which has moved the contact piece 80 until the first boss 803 is located at the rear portion 242*c* of the contact piece rail 242 moves from the middle portion 241*b* to the rear portion 241*c* of the cartridge rail 241, and the contact piece 80 and the drum shaft 54*a* are separated.

When the contact piece 80 moves, the first rotational link 81 moves rearward while rotating in a direction in which the inclination angle with respect to the horizontal direction further decreases. When the first rotational link 81 rotates and moves, the linear motion link 82 further moves linearly rearward. When the linear motion link 82 moves, the second rotational link 83 further rotates in a direction in which the engagement pin 832*a* moves rearward. When the second rotational link 83 rotates, the third rotational link 84 further rotates in a direction in which the engagement pin 842 moves forward.

When the third rotational link 84 rotates, the engagement surface 844*a* of the coupling hole 844 in the operation cam

843 engages with the engagement pin 854 of the shutter link 85 from below. When the engagement surface 844*a* of the coupling hole 844 engages with the engagement pin 854, the shutter link 85 rotates in a direction in which the engagement portion 853 moves upward, and the shutter 64 moves from the closed position toward the open position.

In this case, the movement of the contact piece 80 by the drum shaft 54*a* is transmitted to the linear motion link 82 via the first rotational link 81. Thus, even though the shutter 64 and the process cartridge 50 at the attached position in the apparatus main body 2 are separated from each other (that is, the distance therebetween is large), the force is efficiently transmitted from the contact piece 80 to the shutter 64.

When the drum shaft 54*a* moves the contact piece 80 until the first boss 803 is located at the rear portion 242*c* of the contact piece rail 242 and the linear motion link 82 moves rearward, the contact portion 912 of the pressing arm 91 in the presser 9 moves from the first pressed surface 823*a* to the second pressed surface 823*b* of the linear motion link 82 by the pressing force of the pressing spring 92.

A contact position of the contact portion 912 of the pressing arm 91 with respect to the second pressed surface 823*b* when the contact piece 80 is moved by the drum shaft 54*a* until the first boss 803 is located at the rear portion 242*c* of the contact piece rail 242 varies due to a dimensional tolerance of each member constituting the link 8, a tolerance of a coupling position of each member, and so on.

Thus, the positional relationship between the pressing arm 91 and the link 8 is set such that, when the contact piece 80 is moved by the drum shaft 54*a* until the first boss 803 is located at the rear portion 242*c* of the contact piece rail 242, the contact portion 912 of the pressing arm 91 always contacts the second pressed surface 823*b*. Further, the positional relationship between the pressing arm 91 and the link 8 is set such that, even when the contact portion 912 of the pressing arm 91 contacts the lowermost portion of the second pressed surface 823*b* within the range of the tolerance of each member constituting the link 8, the contact portion 912 does not contact the upper surface 82A located forward of the second pressed surface 823*b*.

Figure 22A:
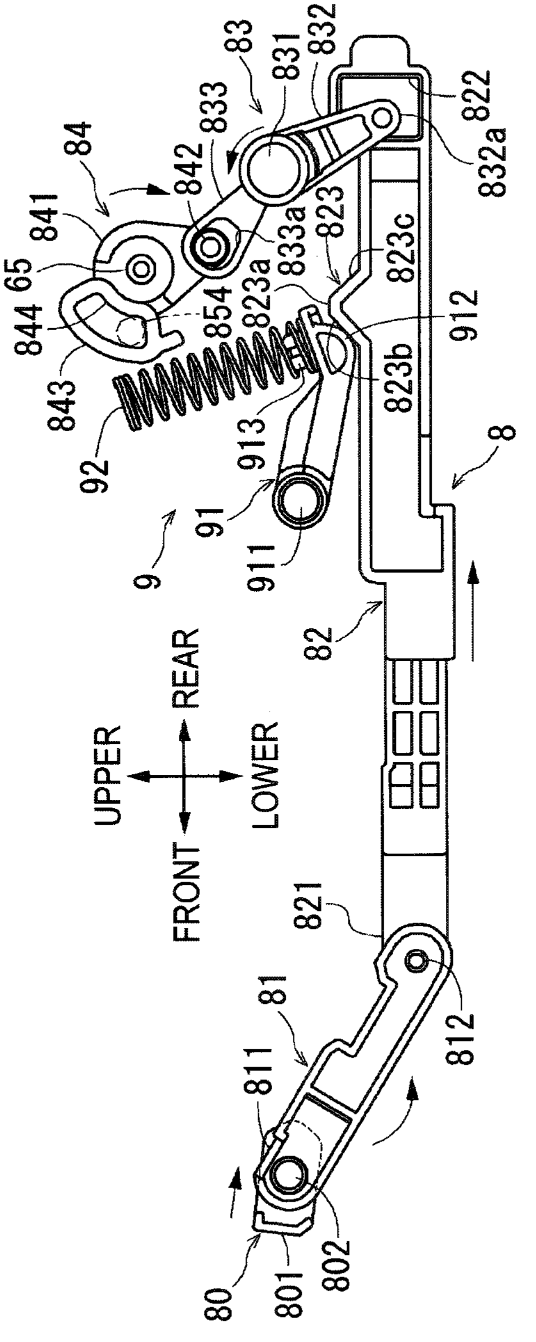
FIGS. 22A and 22B are side views showing the link.
Figure 22B:
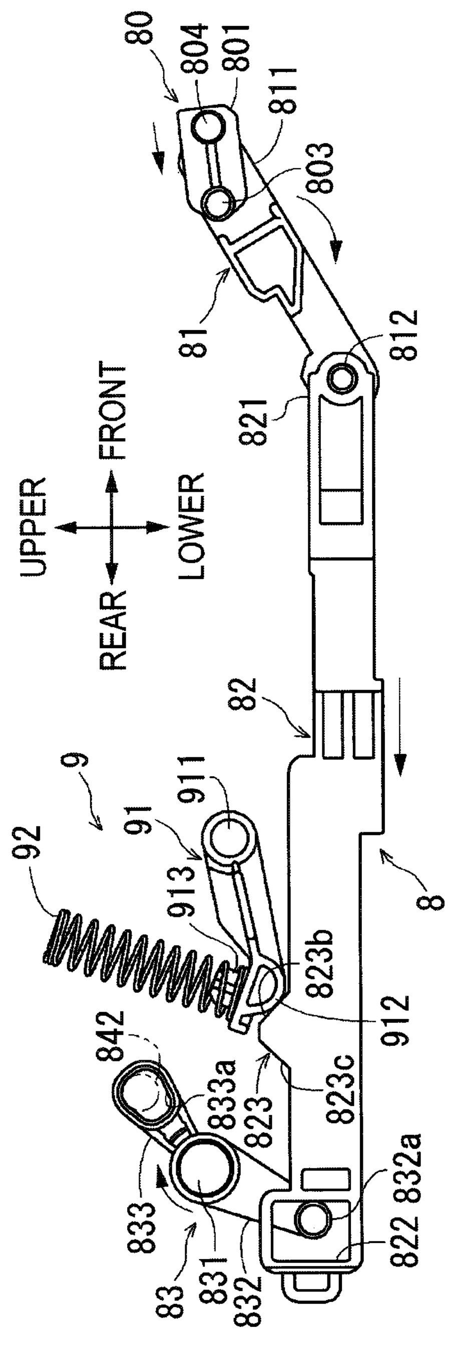

FIGS. 22A and 22B are side views showing a state where the linear motion link 82 is moved rearward from the position shown in FIGS. 19A and 19B by a pressing force from the pressing arm 91. After the contact piece 80 is moved until the first boss 803 is located at the rear portion 242*c* of the contact piece rail 242 and the contact portion 912 contacts the second pressed surface 823*b*, the first boss 803 and the drum shaft 54*a* are separated from each other, and thus the drum shaft 54*a* does not move the contact piece 80. However, as shown in FIGS. 22A and 22B, since the contact portion 912 of the pressing arm 91 contacts the second pressed surface 823*b*, the pressing arm 91 applies a pressing force to the linear motion link 82 in the direction toward the second position, and the linear motion link 82 moves rearward.

Figure 6B:
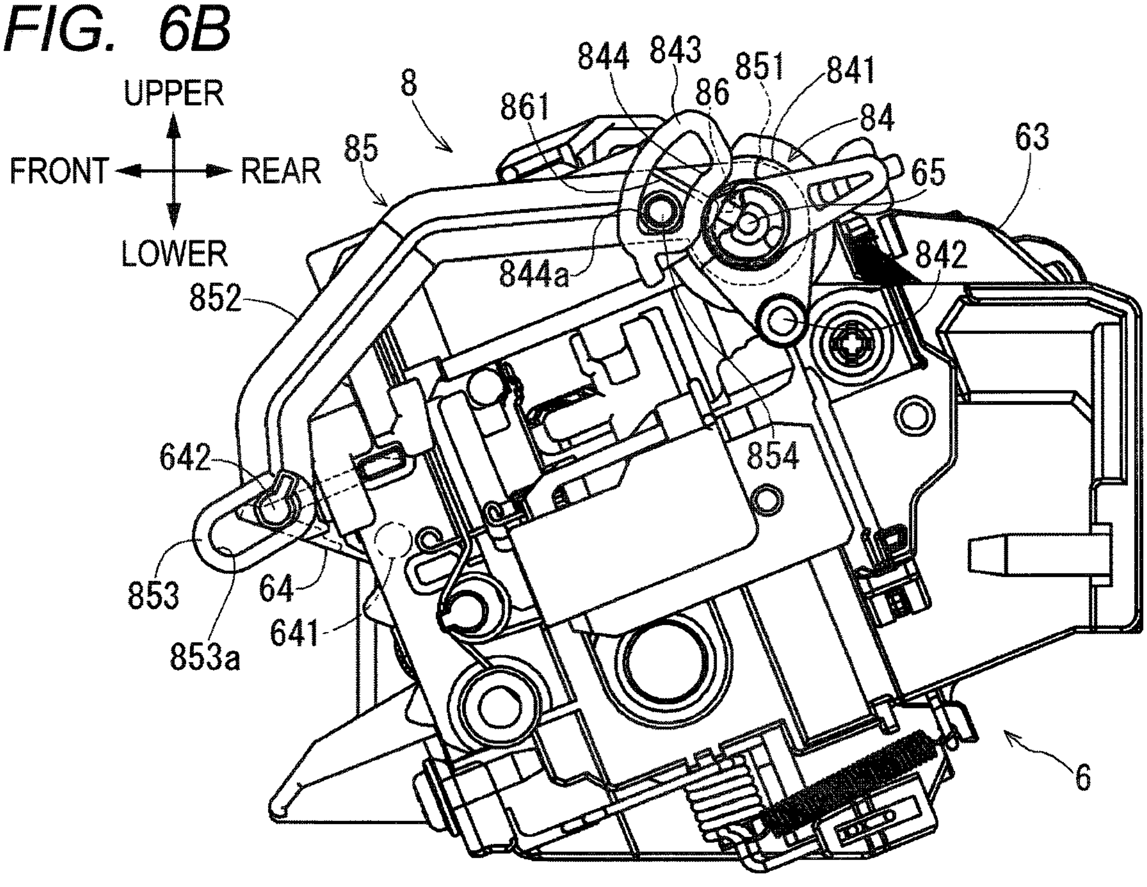
FIG. 6B is a side view showing the fuser in a state where the shutter is at the open position.
Figure 7A:
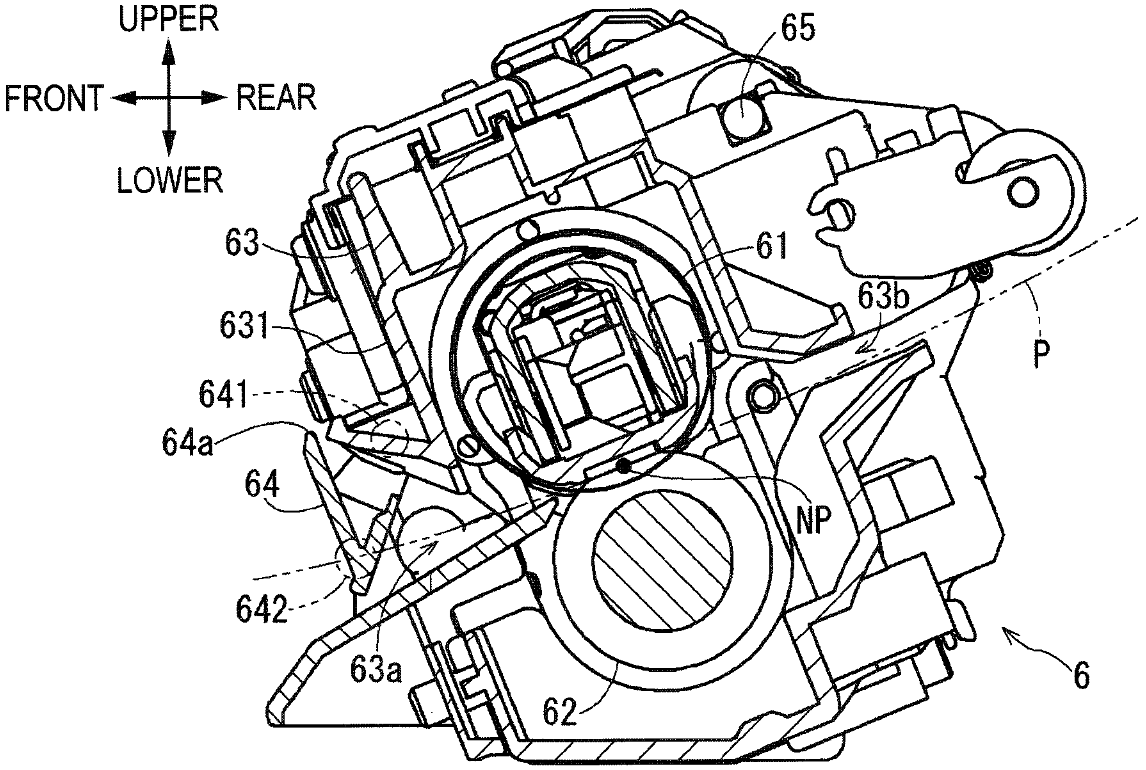
FIG. 7A is a side cross-sectional view showing the fuser in a state where the shutter is at the closed position.
Figure 7B:
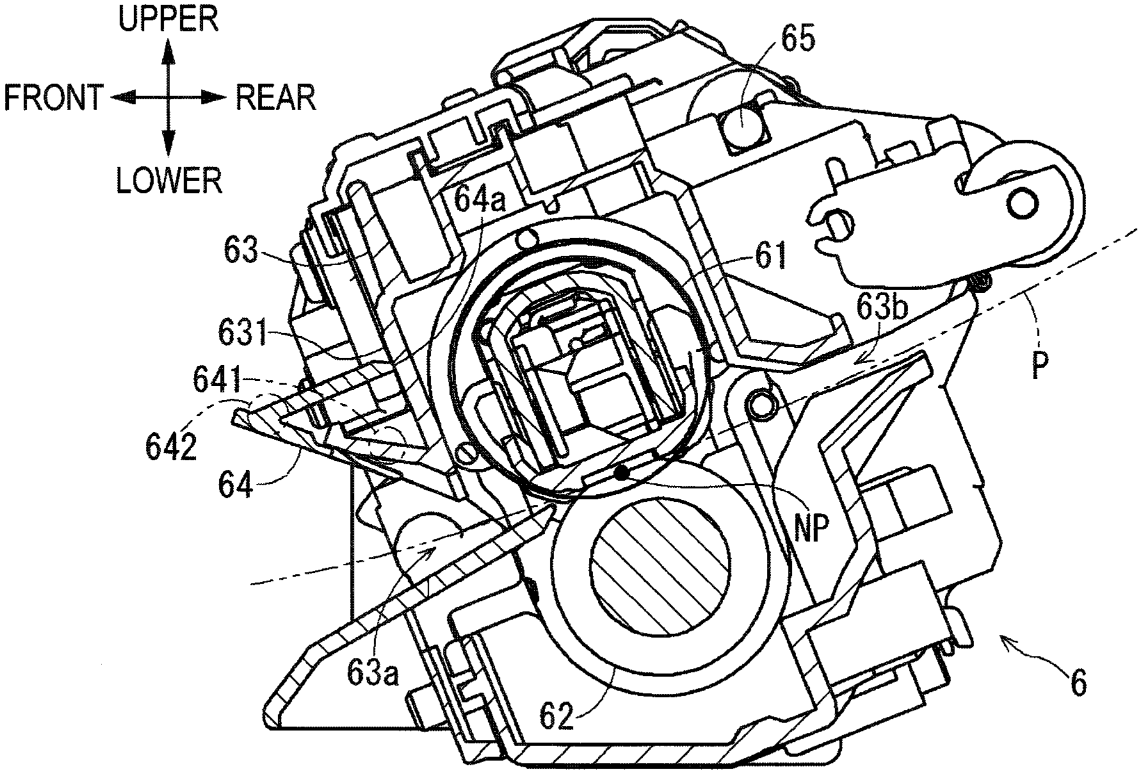
FIG. 7B is a side cross-sectional view showing the fuser in a state where the shutter is at the open position.

As shown in FIG. 6B, when the linear motion link 82 is moved rearward by the pressing force from the pressing arm 91, the shutter link 85 is rotated in a direction in which the engagement portion 853 moves upward, and the shutter 64 moves to the open position.

In this case, it is set such that, even when the linear motion link 82 is moved rearward by the pressing force from the pressing arm 91 until the shutter 64 is moved to the open position, the contact portion 912 of the pressing arm 91 does not contact the upper surface 82A located forward of the second pressed surface 823*b* (see FIGS. 22A and 22B). Thus, the shutter 64 is held at the open position by the pressing force from the pressing arm 91.

Figure 23:
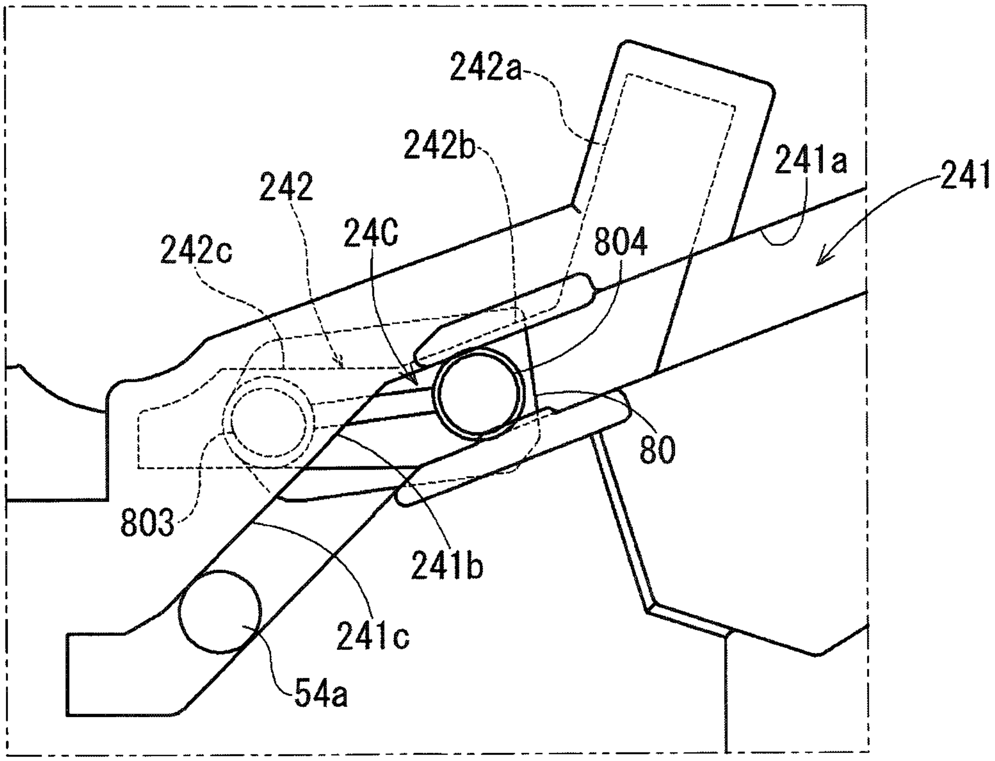
FIG. 23 is an enlarged side view showing the drum shaft and the contact piece.

FIG. 23 is an enlarged side view showing a state where the first boss 803 of the contact piece 80 is moved rearward from the position shown in FIG. 21. As shown in FIG. 23, when the linear motion link 82 is moved rearward by the pressing force from the pressing arm 91, the contact piece 80 is pulled by the first rotational link 81 and moves rearward, and the first boss 803 of the contact piece 80 moves rearward along the rear portion 242*c* of the contact piece rail 242 from the position shown in FIG. 21.

When the shutter 64 moves to the open position, the contact end portion 64*a* contacts the contact surface 631 of the fixing frame 63, and further movement is restricted, and the movement of the link 8 also stops. Since the shutter 64 is restricted from moving further by contacting the contact surface 631, the shutter 64 is held at the open position. Further, since the movement of the link 8 is also stopped, the movement range of the link 8 is suppressed to be small.

In a state where the pressing arm 91 contacts the second pressed surface 823*b*, the contact portion 912 of the pressing arm 91 and the second pressed surface 823*b* engage with each other, and the forward movement of the linear motion link 82 is restricted. Thus, in a state where the shutter 64 has moved to the open position, the position of the linear motion link 82 is fixed by the presser 9, which suppresses the shutter 64 unintentionally moving from the open position to the closed position.

As described above, in the image forming apparatus 1, when the drum shaft 54*a* of the process cartridge 50 being attached to the apparatus main body 2 contacts the contact piece 80 of the link 8 and the drum shaft 54*a* moves the contact piece 80, the shutter 64 moves from the closed position toward the open position, the contact piece 80 and the drum shaft 54*a* are separated before the shutter 64 reaches the open position, and the contact piece 80 separated from the drum shaft 54*a* further moves in a direction in which the shutter 64 moves to the open position.

In such a configuration, when the shutter 64 has moved to the open position, the link 8 having the contact piece 80 and the process cartridge 50 having the drum shaft 54*a* are separated from each other, and thus, the user's operation on the process cartridge 50 does not affect the open/closed state of the shutter 64. Further, after the shutter 64 has moved to the open position, the link 8 does not need to be further moved, and the movement range of the link 8 is suppressed to be small.

In a process in which the process cartridge 50 is attached to the apparatus main body 2, when the link 8 and the process cartridge 50 are separated from each other after the process cartridge 50 and the link 8 contact each other, the pressing arm 91 of the presser 9 presses the linear motion link 82 toward the second position.

Thus, even after the link 8 and the process cartridge 50 are separated from each other, the link 8 is pressed toward the second position by the presser 9, and thus, the shutter 64 is moved to the open position by the link 8 that is pressed.

In particular, the pressing arm 91 presses the second pressed surface 823*b* of the linear motion link 82, whereby the link 8 is moved toward the second position and the shutter 64 is moved to the open position.

When the process cartridge 50 being attached to the apparatus main body 2 and the contact piece 80 of the link 8 contact each other, the pressing arm 91 and the first pressed surface 823*a* of the link 8 contact each other, and the link 8 moves toward the second position such that the second pressed surface 823*b* of the link 8 and the pressing arm 91 contact each other before the link 8 and the process cartridge 50 are separated from each other.

With this configuration, when the link 8 and the process cartridge 50 are separated from each other, the pressing arm 91 and the second pressed surface 823*b* contact each other. Thus, even after the link 8 and the process cartridge 50 are separated from each other, the shutter 64 is moved to the open position by the link 8.

Figure 24:
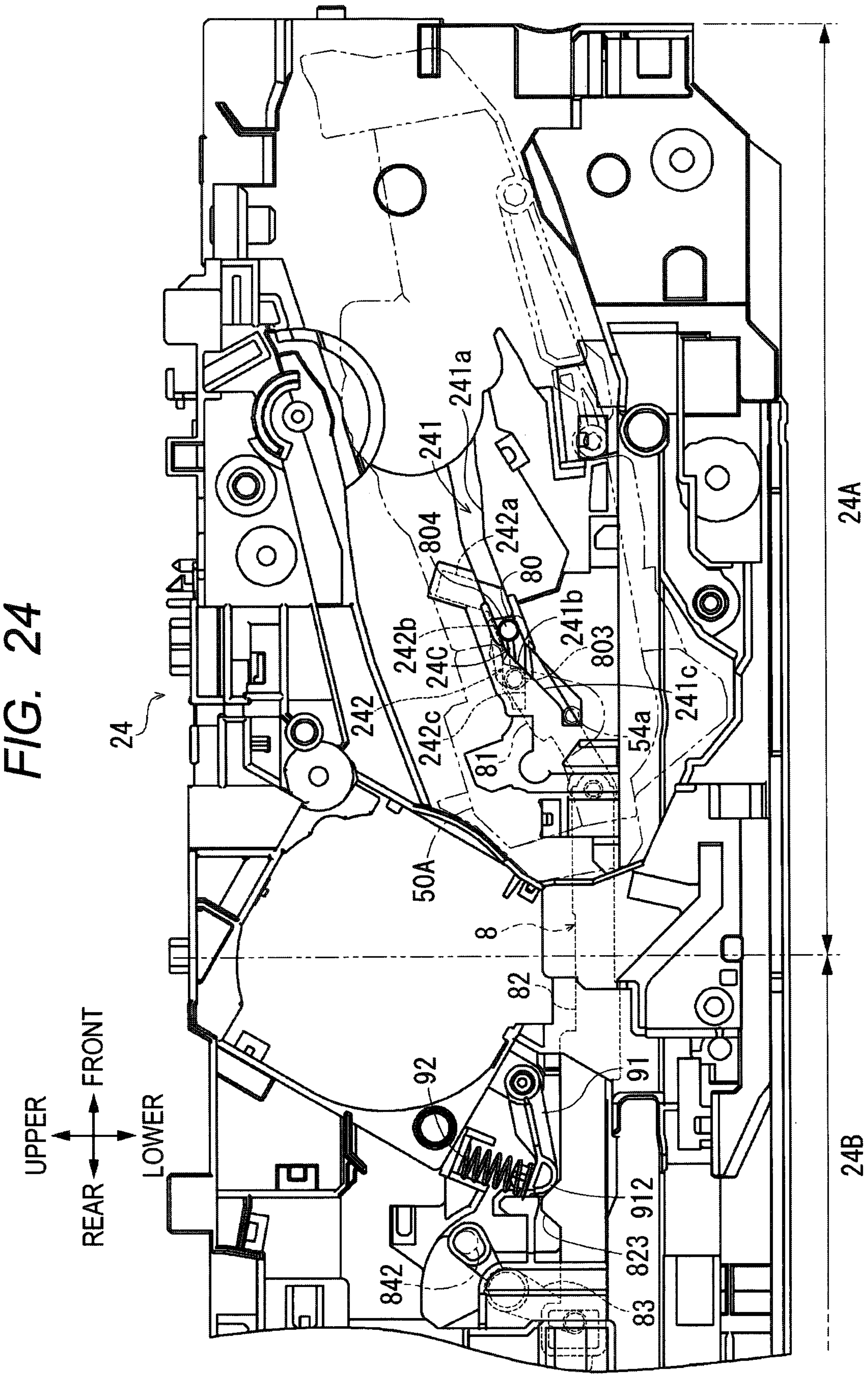
FIG. 24 is a side view showing the first main frame.

FIG. 24 is a side view of the first main frame in a state where the process cartridge 50 has reached the attached position after the drum shaft 54*a* is separated from the contact piece 80. When the process cartridge 50 is further inserted from the position shown in FIG. 20 toward the attached position, the drum shaft 54*a* moves from the middle portion 241*b* to the rear portion 241*c* of the cartridge rail 241, and moves in the attaching direction in the rear portion 241*c*. Thereafter, the process cartridge 50 reaches the attached position as shown in FIG. 24, and is in a state of being attached to the apparatus main body 2.

(Operation when Process Cartridge is Detached)

Next, an operation of the link 8 when the process cartridge 50 at the attached position is detached from the apparatus main body 2 will be described. When the process cartridge 50 is detached, the link 8 operates in a manner opposite to the operation when the process cartridge 50 is attached.

When the process cartridge 50 at the attached position shown in FIG. 24 is detached forward from the apparatus main body 2, the drum shaft 54*a* moves toward the downstream side in a detaching direction in the rear portion 241*c* of the cartridge rail 241. The detaching direction is a direction in which the process cartridge 50 to be detached from the apparatus main body 2 moves toward the outside of the apparatus main body 2 when the process cartridge 50 is detached from the apparatus main body 2. As shown in FIG. 20, when the drum shaft 54*a* moving in the cartridge rail 241 reaches the middle portion 241*b* (the through hole 24C), the drum shaft 54*a* contacts the second boss 804 of the contact piece 80.

As shown in FIG. 17, the contact piece 80 which contacts the drum shaft 54*a* is pressed by the drum shaft 54*a* and moves to the downstream side in the detaching direction of the process cartridge 50. That is, the contact piece 80 moves from a position where the first boss 803 is located at the rear portion 242*c* of the contact piece rail 242 to a position where the first boss 803 is located at the middle portion 242*b* (the through hole 24C).

When the contact piece 80 moves, the first rotational link 81 moves forward while rotating in a direction in which the inclination angle with respect to the horizontal direction increases, and the linear motion link 82 moves linearly forward. When the linear motion link 82 moves, the coupling hole 822 of the linear motion link 82 and the engagement pin 832*a* of the second rotational link 83 engage with each other, and the second rotational link 83 rotates in a direction in which the engagement pin 832*a* moves forward. When the second rotational link 83 rotates, the coupling hole 833*a* of the second rotational link 83 and the engagement pin 842 of the third rotational link 84 engage with each other, and the third rotational link 84 rotates in a direction in which the engagement pin 842 moves rearward.

When the process cartridge 50 is further detached from the apparatus main body 2, the contact piece 80 is further moved to the downstream side in the detaching direction by the drum shaft 54*a* moving in the middle portion 241*b* (the through hole 24C) of the cartridge rail 241.

This movement of the contact piece 80 causes the third rotational link 84 to rotate further in a direction in which the engagement pin 842 moves rearward. When the third rotational link 84 rotates, the coil spring 86 rotates in accordance with the rotation of the third rotational link 84, and the arm portion 861 of the coil spring 86 engages with the engagement pin 854 of the shutter link 85 from above. The arm portion 861 engages with the engagement pin 854, whereby the shutter link 85 rotates in a direction in which the engagement portion 853 moves downward. Thus, the shutter 64 moves from the open position toward the closed position.

In this way, when the process cartridge 50 attached to the apparatus main body 2 is detached from the apparatus main body 2, the contact piece 80 of the link 8 contacts the drum shaft 54*a* of the process cartridge 50, whereby the link 8 moves in a direction in which the shutter 64 at the open position moves to the closed position. Thus, the shutter 64 is moved to the closed position in accordance with an operation of detaching the process cartridge 50 from the apparatus main body 2.

As described above, in the image forming apparatus 1, when the process cartridge 50 is attached to the apparatus main body 2, the drum shaft 54*a* contacts the first boss 803 of the contact piece 80 to operate the link 8 in the direction in which the shutter 64 moves from the closed position to the open position. And, when the process cartridge 50 is detached from the apparatus main body 2, the drum shaft 54*a* contacts the second boss 804 of the contact piece 80 to operate the link 8 in the direction in which the shutter 64 moves from the open position to the closed position. Thus, the link 8 is operated both when the process cartridge 50 is attached and detached with a simple configuration.

While the present disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the present disclosure, and not limiting the present disclosure. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described present disclosure are provided below.

In the above-described embodiment, the link 8 includes the contact piece 80, the first rotational link 81, the linear motion link 82, the second rotational link 83, the third rotational link 84, the shutter link 85, and the coil spring 86. However, the present disclosure is not limited to this, and for example, a configuration may be employed in which one link connected to the shutter 64 contacts the process cartridge 50.

In the above-described embodiment, the shutter 64 is opened and closed by the drum shaft 54*a* of the process cartridge 50 contacting the contact piece 80 of the link 8. However, the present disclosure is not limited thereto, and a configuration may be employed in which another portion of the process cartridge 50 contacts the link 8.

In the above-described embodiment, the presser 9 includes the pressing spring 92 and the pressing arm 91 that is pressed by the pressing spring 92 and contacts the upper surface 82A of the linear motion link 82. However, the presser 9 is not limited to this configuration, and may not have a spring or arm shape as long as the presser 9 is configured to press the link 8.

What is claimed is:

1. An image forming apparatus comprising:

an apparatus main body to which a cartridge is detachably attachable;

a fuser including a heating rotor and a pressure rotor configured to form a nip therebetween;

a shutter movable between a closed position at which the shutter covers the nip and an open position at which the nip is exposed; and a link configured to contact the cartridge, the link being coupled to the shutter and configured to move the shutter between the open position and the closed position, the link being movable between a first position at which the cartridge is not attached to the apparatus main body and a second position at which the cartridge is attached to the apparatus main body, the link and the shutter being configured that:

when the cartridge being attached to the apparatus main body contacts the link, the shutter moves from the closed position toward the open position;

before the shutter reaches the open position, the link and the cartridge separate from each other; and the link having separated from the cartridge moves further in a direction in which the shutter becomes the open position.

2. The image forming apparatus according to claim 1, further comprising a presser configured to:

when the cartridge is being attached to the apparatus main body, press the link toward the second position after the link and the cartridge separate from each other.

3. The image forming apparatus according to claim 2, wherein the presser includes:

a spring; and a pressing arm configured to be pressed by the spring;

wherein the link includes a pressed surface configured to be pressed by the pressing arm; and wherein the pressed surface includes:

a first pressed surface on which a pressing force by the pressing arm does not act in a direction in which the link moves toward the second position; and a second pressed surface on which the pressing force by the pressing arm acts in the direction in which the link moves toward the second position.

4. The image forming apparatus according to claim 3, wherein, when the cartridge being attached to the apparatus main body contacts the link, the pressing arm contacts the first pressed surface; and wherein the pressing arm contacts the second pressed surface before the link and the cartridge separate from each other.

5. The image forming apparatus according to claim 4, wherein the link includes a third pressed surface located opposite to the second pressed surface with respect to the first pressed surface, the third pressed surface being a surface on which the pressing force by the pressing arm acts in a direction in which the link moves toward the first position;

wherein the pressing arm contacts the third pressed surface in a state where the cartridge is not attached to the apparatus main body; and wherein, when the cartridge is attached to the apparatus main body, the pressing arm moves from a state of contact with the third pressed surface to a state of contact with the first pressed surface.

6. The image forming apparatus according to claim 5, wherein the pressing arm presses the link from above;

wherein an upper surface of the link includes the pressed surface;

wherein the link is configured to move in a first direction from the first position toward the second position;

wherein the first pressed surface extends horizontally;

wherein the second pressed surface is inclined upward in the first direction; and wherein the third pressed surface is inclined downward in the first direction.

7. The image forming apparatus according to claim 3, wherein the cartridge includes a photosensitive drum rotatable about a drum shaft; and wherein the link includes:

a contact piece configured to contact the drum shaft;

a first link including the pressed surface; and a second link rotatably coupled to the first link and rotatably coupled to the contact piece.

8. The image forming apparatus according to claim 7, further comprising a frame, the frame including a first guide groove configured to guide the drum shaft and a second guide groove configured to guide the contact piece, wherein the second guide groove is located outside of the first guide groove in an axial direction of the drum shaft.

9. The image forming apparatus according to claim 1, wherein the fuser further includes a fixing frame covering the heating rotor from above; and wherein the fixing frame includes a restricting surface configured to contact the shutter located at the open position and to restrict a position of the shutter.

10. The image forming apparatus according to claim 1, wherein, when the cartridge attached to the apparatus main body is detached from the apparatus main body, the link and the cartridge contact each other and contact of the link and the cartridge causes the shutter located at the open position moves toward the closed position.

11. The image forming apparatus according to claim 10, wherein the cartridge includes a photosensitive drum rotatable about a drum shaft;

wherein the link includes a contact piece configured to contact the drum shaft; and wherein the contact piece includes:

a first boss configured to contact the cartridge that is being attached to the apparatus main body; and a second boss configured to contact the cartridge that is being detached from the apparatus main body.

12. The image forming apparatus according to claim 1, further comprising a frame, the frame including a first guide groove and a second guide groove, the first guide groove being configured to guide a part of the cartridge, wherein the link includes a contact piece configured to contact the part of the cartridge, the second guide groove being configured to guide the contact piece; and wherein the first guide groove and the second guide groove have portions that overlap each other when viewed in an axial direction of a photosensitive drum in the cartridge, the portions being in communication with each other to form a through hole that penetrates the frame.

13. The image forming apparatus according to claim 12, wherein the first guide groove includes a first upstream portion, a first middle portion, and a first downstream portion, the first upstream portion being located upstream of the first middle portion in an attaching direction of the cartridge, the first downstream portion being located downstream of the first middle portion in the attaching direction;

wherein the second guide groove includes a second upstream portion, a second middle portion, and a second downstream portion, the second upstream portion being located upstream of the second middle portion in the attaching direction, the second downstream portion being located downstream of the second middle portion in the attaching direction;

wherein first middle portion and the second middle portion overlap each other and are in communication with each other to form the through hole;

wherein the second upstream portion is located above the first upstream portion; and wherein the second downstream portion is located above the first downstream portion.

14. The image forming apparatus according to claim 13, wherein the contact piece includes a first boss and a second boss, the first boss being located downstream of the second boss in the attaching direction;

wherein, in a state where the cartridge is not attached to the apparatus main body, the first boss is located at the second middle portion and the second boss is located at the second upstream portion;

wherein, when the cartridge is being attached to the apparatus main body, the part of the cartridge moves along the first upstream portion, the first middle portion, and the first downstream portion, and, when the part of the cartridge moves along the first middle portion, the part of the cartridge contacts the first boss located at the second middle portion; and wherein, when the part of the cartridge contacts the first boss located at the second middle portion, the first boss is pressed by the part of the cartridge and moves from the second middle portion to the second downstream portion.

15. The image forming apparatus according to claim 14, wherein, in a state where the cartridge is attached to the apparatus main body, the first boss is located at the second downstream portion and the second boss is located at the second middle portion;

wherein, when the cartridge is being detached from the apparatus main body, the part of the cartridge moves along the first downstream portion, the first middle portion, and the first upstream portion, and, when the part of the cartridge moves along the first middle portion, the part of the cartridge contacts the second boss located at the second middle portion; and wherein, when the part of the cartridge contacts the second boss located at the second middle portion, the second boss is pressed by the part of the cartridge and moves from the second middle portion to the second upstream portion.

16. An image forming apparatus comprising:

an apparatus main body to which a cartridge is detachably attachable;

a fuser configured to heat and pressurize a sheet formed with a toner image thereon, the fuser having an opening that allows the sheet to be conveyed therethrough;

a shutter movable between a closed position at which the shutter covers the opening and an open position at which the sheet is able to pass through the opening; and a link configured to contact the cartridge, the link being coupled to the shutter and configured to move the shutter between the open position and the closed position, wherein in a case that the cartridge moves from outside of the apparatus main body toward an attached position, the link contacts the cartridge and moves the shutter from the closed position toward the open position, the link separates from the cartridge before the cartridge reaches the attached position, and the link moves the shutter to the open position after the link and the cartridge separate from each other.

17. The image forming apparatus according to claim 16, further comprising a presser configured to press the link so that the link moves the shutter to the open position after the link separates from the cartridge.

18. The image forming apparatus according to claim 17, wherein the presser includes:

a spring; and a pressing arm configured to be pressed by the spring; and wherein the link includes a pressed surface configured to be pressed by the pressing arm.

* * * * *